(12) United States Patent
Gundappa et al.

(10) Patent No.: US 11,449,814 B2
(45) Date of Patent: Sep. 20, 2022

(54) APPARATUS AND METHOD FOR WORKFLOW ANALYTICS AND VISUALIZATION OF ASSIMILATED SUPPLY CHAIN AND PRODUCTION MANAGEMENT (SCPM) FOR INDUSTRIAL PROCESS CONTROL AND AUTOMATION SYSTEM

(71) Applicant: Honeywell International Inc., Morris Plains, NJ (US)

(72) Inventors: Madhukar Madhavamurthy Gundappa, Karnataka (IN); Shiju Sasidharan, Kerala (IN); Yogendra Pratap Singh, Karnataka (IN); Girish Venkatasubbarao, Karnataka (IN); Muthulakshmi Balasubramanian, Karnataka (IN)

(73) Assignee: Honeywell International Inc., Charlotte, NC (US)

(*) Notice: Subject to any disclaimer, the term of this patent is extended or adjusted under 35 U.S.C. 154(b) by 569 days.

(21) Appl. No.: 15/834,858

(22) Filed: Dec. 7, 2017

(65) Prior Publication Data
US 2018/0330292 A1    Nov. 15, 2018

Related U.S. Application Data

(60) Provisional application No. 62/505,240, filed on May 12, 2017, provisional application No. 62/505,249, filed on May 12, 2017.

(51) Int. Cl.
*G06Q 10/06* (2012.01)
*G05B 19/418* (2006.01)
(Continued)

(52) U.S. Cl.
CPC ..... *G06Q 10/0633* (2013.01); *G05B 19/4185* (2013.01); *G05B 19/41865* (2013.01);
(Continued)

(58) Field of Classification Search
None
See application file for complete search history.

(56) References Cited

U.S. PATENT DOCUMENTS

| 5,630,069 A | 5/1997 | Flores et al. |
| 6,006,216 A | 12/1999 | Griffin et al. |

(Continued)

FOREIGN PATENT DOCUMENTS

DE    102012202802 A1 *  8/2013  ....... G05B 19/41865

OTHER PUBLICATIONS

Xu, Li Da. Enterprise Systems: State-of-the-Art and Future Trends. IEEE Transactions on Industrial Informatics (vol. 7, Issue: 4, pp. 630-640). Dept. of Inf. Technol. & Decision Sci., Old Dominion Univ., Norfolk, VA, USA. (Year: 2012). (Year: 2012).*

(Continued)

*Primary Examiner* — Patricia H Munson
*Assistant Examiner* — Nancy N Prasad
(74) *Attorney, Agent, or Firm* — Paschall & Associates, LLC; James C. Paschall

(57) ABSTRACT

A method includes obtaining information identifying transactions from multiple sources. The transactions relate to multiple functional domains of a supply chain associated with an industrial process. The method also includes storing the information in a data store according to a unified model. The method further includes providing a common user interface for different functional users. The common user interface is configured to display multiple visualizations and reports associated with the transactions. The method also includes obtaining, according to a user input at the common user interface, one or more metrics and one or more analytics from the data store. The one or more metrics and the one or more analytics are associated with the obtained information. The method also includes configuring the com- (Continued)

mon user interface to display, according to the user input, at least one visualization or report involving the one or more metrics and the one or more analytics.

17 Claims, 19 Drawing Sheets

(51) Int. Cl.
    *G06Q 30/02*     (2012.01)
    *G06F 3/04847*     (2022.01)
    *G06F 3/0482*     (2013.01)
    *G06F 16/28*     (2019.01)
    *G05B 17/02*     (2006.01)

(52) U.S. Cl.
    CPC .......... *G05B 19/41885* (2013.01); *G06Q 10/06312* (2013.01); *G06Q 10/06315* (2013.01); *G06Q 10/06393* (2013.01); *G06Q 30/0201* (2013.01); *G05B 17/02* (2013.01); *G05B 2219/31472* (2013.01); *G05B 2219/31478* (2013.01); *G05B 2219/32088* (2013.01); *G06F 3/0482* (2013.01); *G06F 3/04847* (2013.01); *G06F 16/284* (2019.01)

(56) References Cited

U.S. PATENT DOCUMENTS

| | | | |
|---|---|---|---|
| 7,080,066 | B1 | 7/2006 | Scheurich et al. |
| 7,761,319 | B2 | 7/2010 | Gil et al. |
| 7,904,350 | B2 | 3/2011 | Ayala et al. |
| 3,055,527 | A1 | 11/2011 | Gil et al. |
| 2003/0018516 | A1 | 1/2003 | Ayala et al. |
| 2003/0018701 | A1 | 1/2003 | Kaestle et al. |
| 2003/0093340 | A1 | 5/2003 | Krystek et al. |
| 2004/0210445 | A1 | 10/2004 | Veronese et al. |
| 2005/0240592 | A1* | 10/2005 | Mamou .................. G06Q 10/10 707/999.009 |
| 2009/0018996 | A1* | 1/2009 | Hunt ..................... G06Q 30/02 |
| 2009/0187464 | A1 | 7/2009 | Bai et al. |
| 2009/0319070 | A1 | 12/2009 | Morningred et al. |
| 2011/0040399 | A1 | 2/2011 | Lu |
| 2012/0084110 | A1 | 4/2012 | Wu et al. |
| 2016/0162478 | A1* | 6/2016 | Blassin .......... G06Q 10/063112 706/12 |

OTHER PUBLICATIONS

International Search Report dated Aug. 27, 2018 in connection with International Patent Application No. PCT/US2018/031821, 3 pages.
Written Opinion of the International Searching Authority dated Aug. 27, 2018 in connection with International Patent Application No. PCT/US2018/031821, 6 pages.
International Search Report dated Aug. 27, 2018 in connection with International Patent Application No. PCT/US2018/031843, 3 pages.
Written Opinion of the International Searching Authority dated Aug. 27, 2018 in connection with International Patent Application No. PCT/US2018/031843, 5 pages.

* cited by examiner

FIG. 9B

| J Is Overrid | K Is Translated | L Source Case | M Sourc | N Insured Date |
|---|---|---|---|---|
| False | Source | | | |
| False | Translated | ActualJan4 | 4 | 1/1/2016 12:00:00 AM |
| False | Source | | | |
| False | Translated | ActualJan3 | 3 | 1/1/2016 12:00:00 AM |
| False | Source | | | |
| False | Translated | ActualJan2 | 2 | 1/1/2016 12:00:00 AM |
| False | Source | | | |
| False | Translated | ActualJan1 | 2 | 1/1/2016 12:00:00 AM |
| False | Translated | ActualJan1 | 1 | 1/1/2016 12:00:00 AM |

906

904

Document Actions

Honeywell
Home

Transaction Case

Start Time: Friday, January 1, 2016
End Time: Wednesday, April 26, 2017
Source System: ☐ PAR  ☐ PriceForecast  ☐ RPMS
Model:
Name:
Version: ☑ Source
View: ☑ Translated Get Data    Reset Filter
Get All Case Data    Publish All Case Data
    ReTranslate

FROM FIG. 9A

FIG. 11
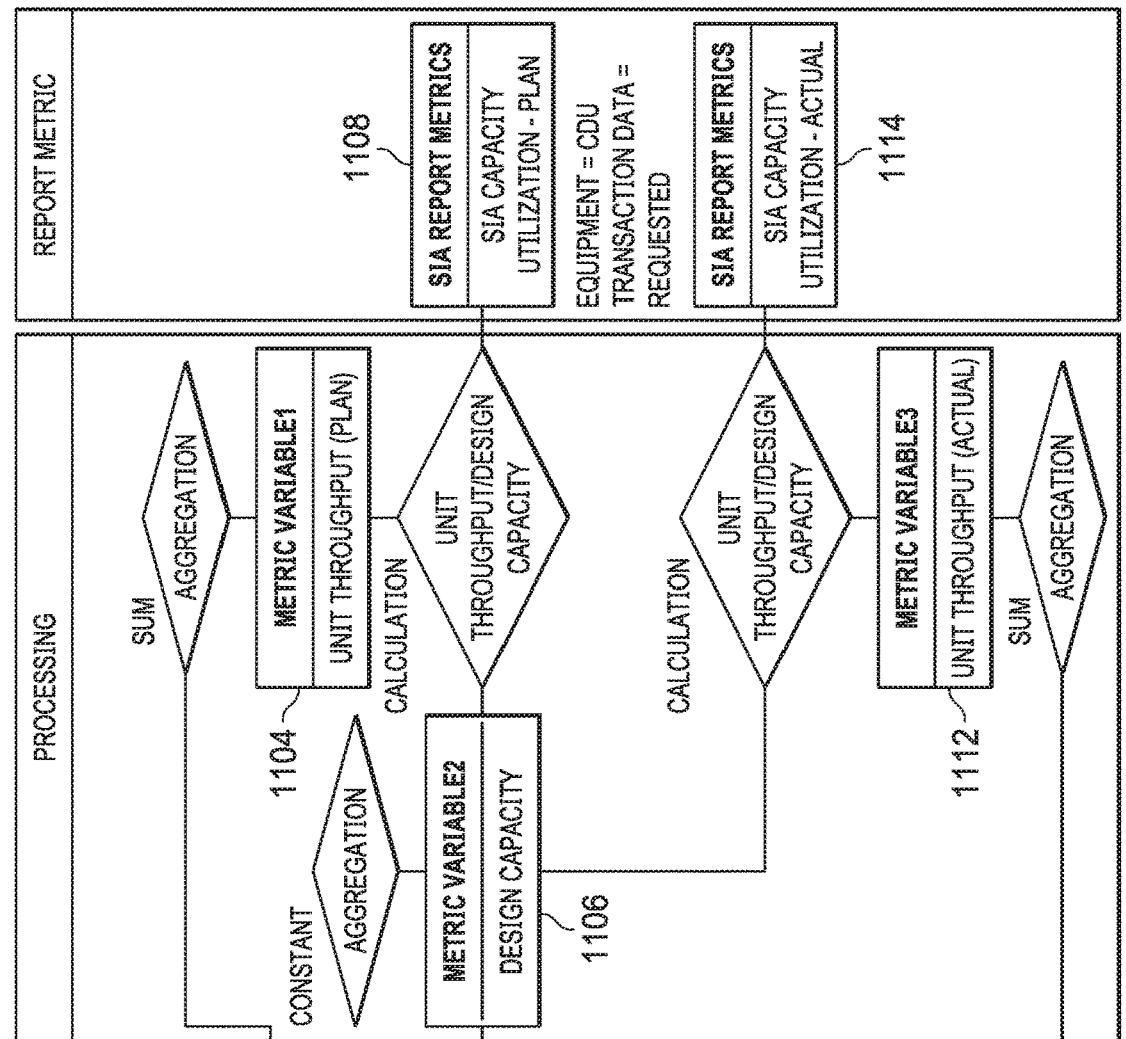
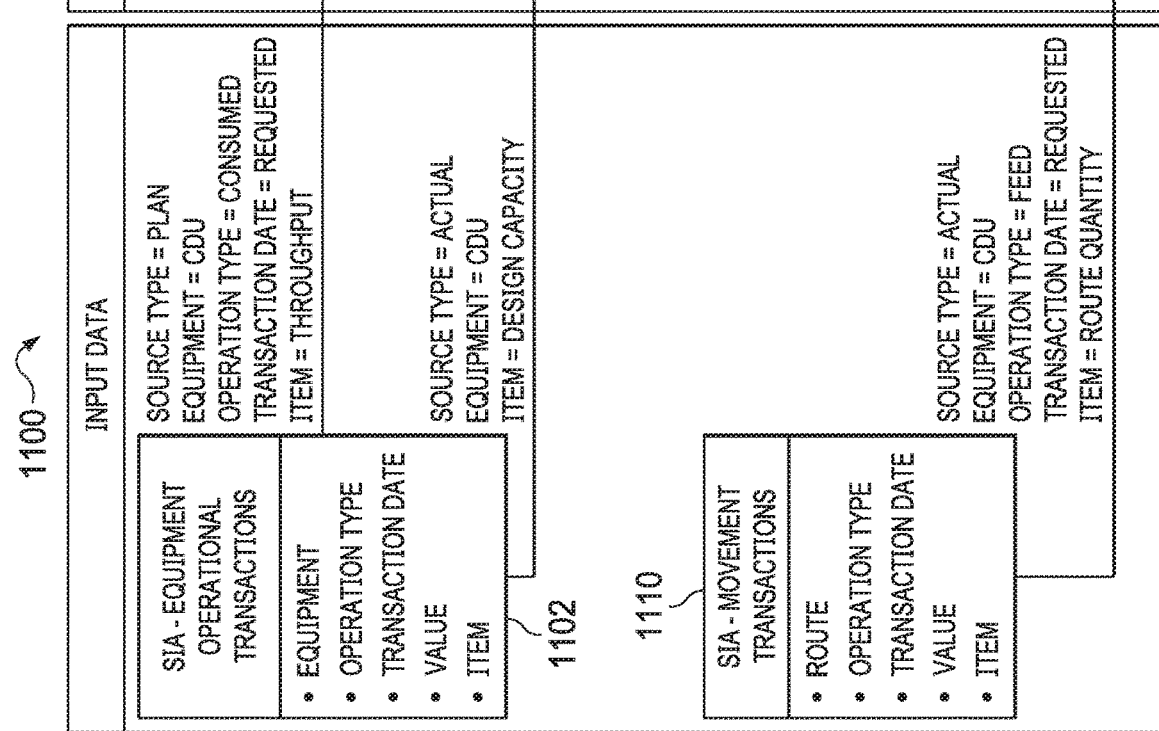

| | A | B | C | D | E | F | G | H | I |
|---|---|---|---|---|---|---|---|---|---|
| 1 | | | | | | | | | |
| 2 | | Report Type | Metric | Start Date | End Date | Model Name | Equipment | Material | Report Status |
| 3 | | Time View | Sales | 1/1/2016 | 12/31/2016 | Refinery_SymModel | | Material (✓) | Generated |
| 4 | | | | | | | | | |
| 5 | | Metric Name : Sales, UOM : M3 | | | | | | | |
| 6 | | From Date | To Date | Material | Plan | Actual | Deviation | Comment | |
| 7 | | | | Material | | | | | |
| 8 | | | | .CRUDE | 240 | 480 | -240 | | |
| 9 | | | | ..Sour Crude | 1000 | 1200 | -200 | | |
| 10 | | | | ..Sweet Crude | 600 | 800 | -200 | | |
| 11 | | 1/1/2016 0:00 | 12/31/2016 0:00 | .DIESEL | 400 | 400 | 0 | | |
| 12 | | | | ..Diesel Grade1 | 240 | 480 | -240 | | |
| 13 | | | | ..Diesel Grade2 | 120 | 240 | -120 | | |
| 14 | | | | .Intermediate | 120 | 240 | -120 | | |
| 15 | | | | ..Intermediate1 | 50 | 80 | -30 | | |
| 16 | | | | ..Intermediate2 | 25 | 40 | -15 | | |
| 17 | | | | | 25 | 40 | -15 | | |

1200

Report

| | A | B | C | D | E | F | G | H | I |
|---|---|---|---|---|---|---|---|---|---|
| 1 | | | | | | | | | |
| 2 | | Report Type | Metric | Start Date | End Date | Model Name | Equipment | Material | |
| 3 | | Case View | Sales | 1/1/2016 | 3/31/2016 | Refinery_PlanModel | | CRUDE, DIESEL, Intermediate, SR_DIESEL | |
| 4 | | | | | | | | | |
| 5 | | Metric Name : Sales, UOM : M3 | | | | | | | |
| 6 | | Material | 1/1/2016-1/31/2016 | | | 1/2/2016-3/31/2016 | | | Comment |
| 7 | | | Deviation | Plan | Actual | Deviation | Plan | Actual | |
| 8 | | | | | | | | | |
| 9 | | CRUDE | 25 | 0 | 0 | 25 | 0 | 0 | |
| 10 | | DIESEL | -135 | 80 | 240 | 262 | 237 | 0 | |
| 11 | | Intermediate | 25 | 0 | 0 | 25 | 0 | 0 | |
| 12 | | SR_DIESEL | 25 | 0 | 0 | 25 | 0 | 0 | |

Report

| | A | B | C | D | E | F | G | H | I |
|---|---|---|---|---|---|---|---|---|---|
| 1 | | | | | | | | | |
| 2 | | Report Type | Metric | Start Date | End Date | Model Name | Equipment | Material | Report Status |
| 3 | | Compare View | Sales, Sales_Filter, MaterialInventory, UnitThroughput | 1/1/2016 | 3/31/2016 | Refinery_PlanModel | CRUDE TANK, DIESEL TANK, Intermediate Tank, BLENDER, CDU, BUY, SELL | 140-150 Nph/Kero, CRUDE, DIESEL, Intermediate, SR_DIESEL | Generated |
| 4 | | | | | | | | | |
| 5 | | Metric Name : Sales, UOM : M3 | | | | | | | |
| 6 | | | | 1/1/2016-1/31/2016 | | | 1/2/2016-3/31/2016 | | |
| 7 | | Material | | PlanJanToMarch2016_1 | PlanJanToMarch2016_2 | Deviation | PlanJanToMarch2016_1 | PlanJanToMarch2016_2 | Deviation | Comment |
| 8 | | | | | | | | | |
| 9 | | CRUDE | | 80 | 100 | -20 | 250 | 237 | -13 | |
| 10 | | DIESEL | | 80 | 100 | -20 | 250 | 237 | -13 | |
| 11 | | Intermediate | | 50 | 120 | -70 | 120 | 100 | -20 | |
| 12 | | SR_DIESEL | | 50 | 120 | -70 | 120 | 100 | -20 | |

Report

FIG. 14B

Document Actions

Compare View

Date Filter
○ Date Period
◉ Date Range

Start Date  01/01/2016 12:00:00 AM
End Date    12/31/2016 12:00:00 AM

Case Source       | Plan
Case Model        | Refinery_PlanModel
Case Source Type  | Quaterly Rolling Plan
Case Name         | PlanJanToMarch2016
Version           | 1
Case Status Date  | Approved [12/31/2015 6:30:00 PM]
Metric            | Sales,Sales_Filter,SaterialInventory,UnitT Case Source 1 Type | Quaterly Rolling Plan
Case Name1         | PlanJanToMarch2016
Version            | 2
Case Status Date   | Created [12/31/2015 6:30:00 PM]
Equipment          | BLENDER, CDU, BUY, SELL
Material           | EL, Intermediate, SR_DIESEL ☑ Show Deviation  ☐ Show Equal  ☐ Show Not Equal

[Generate Report]  [Reset]

Honeywell

[1]  [2]  [3]

FROM FIG. 14A

APPARATUS AND METHOD FOR WORKFLOW ANALYTICS AND VISUALIZATION OF ASSIMILATED SUPPLY CHAIN AND PRODUCTION MANAGEMENT (SCPM) FOR INDUSTRIAL PROCESS CONTROL AND AUTOMATION SYSTEM

CROSS-REFERENCE TO RELATED APPLICATIONS AND PRIORITY CLAIM

This application claims priority under 35 U.S.C. § 119(e) to U.S. Provisional Patent Application No. 62/505,240 and U.S. Provisional Patent Application No. 62/505,249, which were filed on May 12, 2017. Both of these applications are hereby incorporated by reference in their entirety.

TECHNICAL FIELD

This disclosure generally relates to industrial process control and automation systems. More specifically, this disclosure relates to an apparatus and method for assimilation of supply chain and production management (SCPM) for an industrial process control and automation system.

BACKGROUND

Optimization in production planning and scheduling can be a key focus for any process industry once an industrial process enters into stable operation. Along with production, supply chain activities (from raw material supplies to deliveries of finished products to customers) often need to be coordinated along with production management. This can become a driver for achieving efficient production and reliable delivery, and it helps in achieving required levels of operational margins to move towards profitability goals.

SUMMARY

This disclosure provides an apparatus and method for workflow analytics and visualization of assimilated supply chain and production management (SCPM) for an industrial process control and automation system.

In a first embodiment, a method includes obtaining information identifying transactions from multiple sources, where the transactions relate to multiple functional domains of a supply chain associated with at least one industrial process in an industrial process control and automation system. The method also includes storing the information in a data store according to a unified model, where the unified model represents all of the multiple sources. The method further includes providing a common user interface for different functional users, where the common user interface is configured to display multiple views and multiple reports associated with the transactions. The method also includes obtaining, according to a user input at the common user interface, one or more metrics and one or more analytics from the data store, where the one or more metrics and the one or more analytics are associated with the obtained information. In addition, the method includes configuring the common user interface to display, according to the user input, at least one view or report involving the one or more metrics and the one or more analytics in a requested unit of measure for a requested reporting interval.

In a second embodiment, an apparatus includes at least one processing device configured to obtain information identifying transactions from multiple sources, where the transactions relate to multiple functional domains of a supply chain associated with at least one industrial process in an industrial process control and automation system. The at least one processing device is also configured to store the information in a data store according to a unified model, where the unified model represents all of the multiple sources. The at least one processing device is further configured to provide a common user interface for different functional users, where the common user interface is configured to display multiple views and multiple reports associated with the transactions. The at least one processing device is also configured to obtain, according to a user input at the common user interface, one or more metrics and one or more analytics from the data store, where the one or more metrics and the one or more analytics are associated with the obtained information. In addition, the at least one processing device is configured to configure the common user interface to display, according to the user input, at least one view or report involving the one or more metrics and the one or more analytics in a requested unit of measure for a requested reporting interval.

In a third embodiment, a non-transitory computer readable medium contains instructions that, when executed by at least one processing device, cause the at least one processing device to obtain information identifying transactions from multiple sources, where the transactions relate to multiple functional domains of a supply chain associated with at least one industrial process in an industrial process control and automation system. The medium also contains instructions that, when executed by the at least one processing device, cause the at least one processing device to store the information in a data store according to a unified model, where the unified model represents all of the multiple sources. The medium further contains instructions that, when executed by the at least one processing device, cause the at least one processing device to provide a common user interface for different functional users, where the common user interface is configured to display multiple views and multiple reports associated with the transactions. The medium also contains instructions that, when executed by the at least one processing device, cause the at least one processing device to obtain, according to a user input at the common user interface, one or more metrics and one or more analytics from the data store, where the one or more metrics and the one or more analytics are associated with the obtained information. In addition, the medium contains instructions that, when executed by the at least one processing device, cause the at least one processing device to configure the common user interface to display, according to the user input, at least one view or report involving the one or more metrics and the one or more analytics in a requested unit of measure for a requested reporting interval.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 9A and 9B illustrate an example user interface of a case configuration client to monitor transactions that are published by the external systems according to this disclosure;

FIG. 11 illustrates an example method for processing an analytics metric according to a request from a user, according to this disclosure;

FIGS. 12A through 14B illustrate example user interfaces showing different views of analytics according to this disclosure;

DETAILED DESCRIPTION

Figure 1:
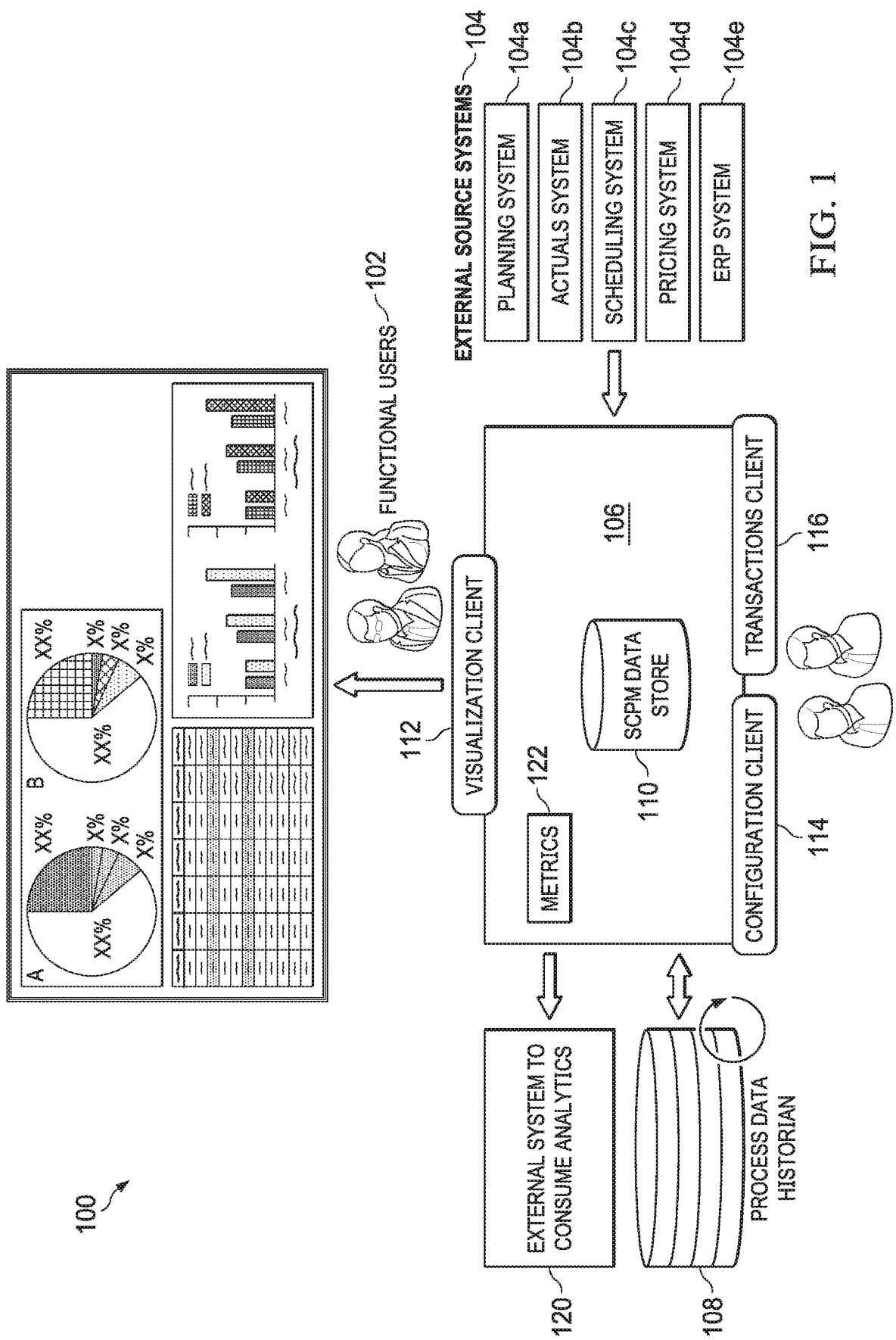
FIG. 1 illustrates details of an example system for supply chain and production management (SCPM) assimilation and workflow analytics according to this disclosure.

FIGS. 1 through 17, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described in this patent document. Omission of a feature or component from a particular figure is for purposes of simplicity and clarity and is not meant to imply that the feature or component cannot be employed in the embodiment(s) described in connection with that figure.

As noted above, supply chain activities often need to be coordinated along with production management, which can help achieve efficient production, reliable delivery, and required levels of operational margins. However, this is often difficult for a number of reasons. For example, supply chain processes typically span multiple functional domains, such as production, distribution, and sales. This often results in decision-based problems with different time horizons and granularity (from strategic to operational). These processes are also often carried out in functional "silos" within an organization, meaning there is less coordination between the processes. These activities may further involve a wide range of functional users, such as inventory managers, production managers, and sales managers, who are in different roles and who use different systems supplied from various vendors in their day-to-day activities.

Example systems that could be used by different personnel include planning and scheduling systems, trading systems, chartering and logistics systems, treasury systems, marketing systems, operations systems, and the like. Planning systems are used for forecasting production and supply chain activities in order to achieve optimization goals. Planning is often done on a longer horizon (such as monthly, quarterly, annually, or multi-yearly). In complex process industries like oil and gas refineries, it may be important or essential to have day-to-day feasible plans or schedules that meet all targets identified in a plan. Also, actual accomplishments are accounted from production accounting systems, along with pricing systems to consider economic impacts.

The optimization of supply chain and production management (SCPM) activities is typically a very complex process. This can be due to a number of factors. For example, the complexity of process units implementing an industrial process, the wide range of raw materials feeding to process into these units on a day-to-day basis, a blending of intermediate products on a day-to-day basis to achieve production goals, purchase of raw materials, and sales and shipping of products, etc., often require that multiple functional users use different systems or applications, which can create functional silos within the same organization. Each of the functions can have its own model of a supply chain and possibly its own proprietary tools in order to optimize functional goals, and a method to develop overall decision support in a holistic way remains a challenge. Cross-functional activities among functional users are needed to achieve the desired level of optimization calls for offline collaboration. It is often a challenge to achieve the best degree of integration among the systems or applications.

Even upon achieving reliable integration, there may still be difficulties catering to the needs of different functional users, such as getting the right level of visibility of cross-functional data, configurable analytics, and collaboration among functional users. Each system or application can use its own version of functional data, and after integration it becomes challenging to functional users to pick or coordinate with the right version of data. Different systems or applications can use different plan horizons for planning, scheduling, and actual monitoring, and functional users need to apply an appropriate level of aggregation or proration to derive accurate results. Also, the systems or applications can use different organizational structures, different business hierarchies, and different material catalogs when publishing their information. In addition, the systems or applications can issue multiple versions of their own information covering differing and overlapping time periods. The latest released data for any time period may need to be used for analytics, while previous versions may need to be kept for comparisons.

There may be a need or desire to ensure availability of a wide range of analytics data to functional users, who need to evaluate the data before taking complex decisions. Also, there may be a need or desire to standardize the integration mechanism, the definition of unified models, and analytics metrics to extend the solution to other users. In addition, there may be a need or desire for scalability of the solution to accommodate additional manufacturing facilities.

Considering the various issues identified above, this disclosure supports a solution for SCPM assimilation, workflow analytics, and visualization by achieving a common cross-functional data repository and by providing faster integration, more effective analytics on the data repository, common and better visualizations, better scalability, and improved collaboration. The workflow associated with example embodiments of the solution facilitates better integration, aggregation, and workflow analytics and visualization as described below.

With respect to integration, a unified model is built to represent different source system models that exist in different SCPM applications or systems. Flexible integration is provided among these source systems through a common database schema, such as an SCPM data store and Service Oriented Architecture (SOA)-based interfaces. Third-party external systems are enabled to publish transactions into the SCPM data store, which represents a single, unified SCPM model for the disparate data sources. A set of metrics used for analytics is defined, automatic and on-demand calculations of those metrics are enabled, and the calculations are published to one or more plant historians or to the SCPM data store itself. Transactional data of the SCPM data store can be archived and preserved over a preconfigured horizon so that the queries focus on the optimal set of records. The unified model is scalable to extend to multiple sites.

With respect to aggregation, configuration-driven algorithms driven from the unified model can be included to allow aggregation of the most-current thread of information from contributing applications and systems. The aggregated information provides one consolidated picture across an organization, across a physical plant and equipment, across materials, and across time.

With respect to workflow analytics and visualization, a common infrastructure is offered to view various data involved with the SCPM activities. Various modes of data views are supported to meet different functional user expectations. Collaboration is enabled among various functional users on the SCPM activities through the platform. Users are also enabled to define and customize formats and styles for capturing data from the SCPM data store to use in other applications.

These features can be used together in an assimilation platform in order to support the collection, storage, and use of SCPM data. Among other things, the techniques provided in this disclosure offer an architecture with at least one SCPM data store for smooth operation of SCPM functions of a process industry (such as a refinery). The SCPM data store is based on the unification of data from various external source systems (such as for any vendor that is commonly used by functional users of SCPM operations). The SCPM data store can include a common relational database schema able to store consolidated operational data from each of the different types of external source systems used in the SCPM activities.

In some embodiments, an SOA-based interface enables the SCPM data store to integrate third-party source systems via middleware, such as MICROSOFT BIZTALK. Versioning of transactions and information submissions ensure that the correct versions are provided for cross-functional usage across SCPM functional users. Data processing failures can be tracked and users can be notified about the status of backend transactions from each external source system to the common SCPM data store.

A client (such as a web-based or mobile device-based client) allows users to view complete or required transactions of different source systems. In some embodiments, the client facilitates manual publishing of data to users for overrides or populating transactions, such as for test purposes. Also, in some embodiments, diagnostic support is available to direct users to those transactions of the external source system(s) that have issues.

The disclosed embodiments could be implemented in a standalone manner or in conjunction with other functionality. As a particular example, the disclosed embodiments could be combined with any suitable production planning, accounting, and optimization suites for advanced production management, such as the INTUITION platform from HONEYWELL INTERNATIONAL INC.

FIG. 1 illustrates details of an example system 100 for SCPM assimilation and workflow analytics according to this disclosure. As shown in FIG. 1, various SCPM activities can be carried out by different functional users 102 using different types of external source systems 104. Data from the external source systems 104 is received at an assimilation and workflow engine 106. The assimilation and workflow engine 106 may also receive data from at least one process data historian 108. The assimilation and workflow engine 106 assimilates the data from the various sources and stores the assimilated data in an SCPM data store 110. Analytics can run on the data, and these analytics metrics 122 can be stored in the SCPM data store 110 (or a copy thereof) or can be written back to the process data historian 108 or to one or more external systems 120 that consume (use) the data, such as for analytical purposes. The metrics in the SCPM data store 110 can also be used by various clients, such as one or more visualization clients 112, one or more configuration clients 114, and one or more transaction clients 116.

The external source systems 104 include various external systems associated with supply chain activities, such as planning systems 104a, actuals systems 104b, scheduling systems 104c, pricing systems 104d, enterprise resource planning (ERP) systems 104e, and the like. The external source systems 104 can span multiple functional domains, such as production, distribution, and sales. The external source systems 104 may represent or be used by different vendors associated with a supply chain. For instance, the external source systems 104 can include the planning, production accounting, and scheduling systems of any vendor. In some embodiments, the external source systems 104 could be the primary source of data for the system 100. However, the system 100 can also read data from the process data historian 108, which allows users to obtain data from industrial process control and automation systems for use in SCPM assimilation. Each of the external source systems 104 includes any suitable structure(s) for providing data to the system 100, such as one or more computing devices, servers, networks, databases, and the like.

The assimilation and workflow engine 106 can represent the main processing engine for the system 100. The assimilation and workflow engine 106 provides assimilated SCPM by integrating data from the external source systems 104 and other sources. After integrating (such as with middleware), the assimilated SCPM acts as one system through which different functional users connect and operate for their day-to-day online collaborations. The assimilation and workflow engine 106 can also automatically define and calculate metrics 122 (such as on a configured frequency) and write the calculated metrics 122 to the process data historian 108 or other destination(s). This allows for prolonged storage and use of the metrics 122 by any of the external systems 120.

The metrics 122 can represent a measurement of performance or efficiency of particular SCPM activities. Examples of metrics 122 can include sales, purchase, consumption, inventory, production rate, throughput, and capacity utilization. A more specific example could be "sales of kerosene over a one-month time period." The metrics 122 can be defined according to one or more variables and one or more mathematical operations (such as summation, aggregation, percentage, deviation, or any user configured expressions). Additionally or alternatively, users could query the process data historian 108 to retrieve the metrics that were automatically calculated and stored, or use the assimilation and workflow engine 106 to request to calculate the metrics 122. For example, an external user could readily view the metrics 122 on a dashboard, rather than requesting and waiting for an application to calculate and provide the metrics 122 for every request.

The assimilation and workflow engine 106 can archive transactions over a specified time horizon to prevent accidental overrides and to optimize the records to query, and can ensure that functional user requests are sent to the correct sources for visualization of analytics. The assimilation and workflow engine 106 can also support both on-demand and automatic analytics on configured metrics 122 and can notify users about those metric computations. The assimilation and workflow engine 106 can further store computed metrics 122 in the SCPM data store 110 or a plant historian, such as the process data historian 108, which can be used by any external system 120 for monitoring key performance indicators (KPIs) or other information about industrial processes. In addition, the assimilation and workflow engine 106 can access computed metrics 122 over service-based interfaces so that any external system 120 can use the metrics 122.

The assimilation and workflow engine 106 includes any suitable structure for receiving, processing, storing, and transmitting data. For example, the assimilation and workflow engine 106 can denote a computing device that executes applications for the functional users 102, the clients 112-116, or other applications. The applications could be used to support various functions for the clients 112-116, the external systems 120, or other components of the system 100.

The process data historian 108 represents a component that stores various information related to industrial process control and automation. For example, the process data historian 108 allows users to obtain data from one or more industrial control and automation systems for use in SCPM assimilation. This also allows the assimilation and workflow engine 106 to use the data from the historian in calculating the metrics 122, as well as to write back the calculated metrics 122 to the process data historian 108 for prolonged storage and ready use without waiting. In some embodiments, the process data historian 108 is accessed using an OLE for Process Control (OPC) Historical Data Access (HDA) protocol. The process data historian 108 includes any suitable structure for storing and facilitating retrieval of information. Although shown as a single component here, the process data historian 108 could be located elsewhere in the system 100, or multiple historians could be distributed in different locations in the system 100.

The SCPM data store 110 is a common data repository that stores planning, scheduling, accounting, pricing, and other SCPM transactions that were published by external systems, such as the external source systems 104. The SCPM data store 110 also includes a schema to store report metric definitions and system configurations. The SCPM data store 110 includes any suitable structure for storing and facilitating retrieval of information. Although shown as a single component here, the SCPM data store 110 could be located elsewhere in the system 100, or multiple data stores could be distributed in different locations in the system 100. In some embodiments, the SCPM data store 110 is implemented using a MICROSOFT SQL SERVER database or another similar database, although other database or storage technologies could be used.

The visualization clients 112 provide common visualizations of planning, scheduling, accounting, and other data for different users, and the users do not have to refer to different external source systems 104 for their day-to-day activities. Each visualization client 112 can be used to provide information to a user and receive information from a user. Different visualization clients 112 could include a view and report client 112a and a data collection client 112b. The view and report client 112a provides analysis of plan versus actual data. This can include analysis on a selected timeline, analysis on a selected plan version, comparison of different plans, and one or more templates for web reports. The data collection client 112b allows a user to collect data for backcasting activities in an external application. Such data can be collected for a selected time range, for selected intervals, and on a required format that is compatible with the external application. Further details of the clients 112a-112b are provided below.

The visualization clients 112 provide users with the ability to customize and use report templates per the users' needs. Depending on the need, a user can view data for analytics on a display or in a website or capture data in a file. Each visualization client 112 includes any suitable structure for displaying information to and interacting with a user. For example, each visualization client 112 could represent a computing device running a WINDOWS operating system or other operating system. Each visualization client 112 can implement or execute a customizable template in a worksheet application, such as MICROSOFT EXCEL. Such a template can provide the benefits of EXCEL functionality and can even enable viewing and reporting of analytics data with minimal user operations. Additionally or alternatively, each visualization client 112 could include a website, a mobile application, or any other suitable platform having a user interface.

The configuration client 114 is a configuration tool to build models and model mappings. The configuration client 114 provides users (such as a project manager) with the ability to build unified models based on models of different external source systems 104 that need to be integrated with the solution, including models of the external systems with items, mappings of the models, and mappings of the items with the unified model. The mappings can be arranged in one or more templates. The configuration client 114 can manage multiple releases of information from different external source systems 104 over different and overlapping time periods. The configuration client 114 provides flexible bi-directional configuration workflows (such as source system-to-unified model or unified model-to-source system) at the user's convenience. The architecture of the system 100 is scalable to multiple unified models in order to represent different manufacturing facilities or other facilities.

The configuration client 114 can create associations of equipment and material entities of a process in a hierarchical relationship, which can be based on any physical or logical association. This hierarchical relationship can be independent across each of the external source systems 104, as well as for the unified model. The configuration client 114 can facilitate analytics on selected process equipment or materials from these hierarchy associations. A configuration of metric overrides can be created for specific entities. The configuration client 114 may include auxiliary features that can quickly point to items defined across the external source systems 104 within the unified model to ensure full coverage.

The configuration client 114 allows the user to obtain complete or required parts of configuration information using simple user inputs (such as one or more mouse clicks) from a client device anywhere on a network. The configuration client 114 can track configuration changes and notify users about configuration changes.

The configuration client 114 includes any suitable structure for displaying information to and interacting with a user. For example, the configuration client 114 could represent a computing device running a WINDOWS operating system or other operating system. The configuration client 114 can be implemented in a customizable template in a worksheet application (such as MICROSOFT EXCEL), a website, a mobile application, or any other suitable platform having a user interface.

The transaction client 116 is a graphical tool that provides a user with the capability to manage case data published from source systems. The transaction client 116 includes any suitable structure for displaying information to and interacting with a user. For example, the transaction client 116 could represent a computing device running a WINDOWS operating system or other operating system. The transaction client 116 can be implemented in a customizable template in a worksheet application (such as MICROSOFT EXCEL), a website, a mobile application, or any other suitable platform having a user interface.

Figure 2:
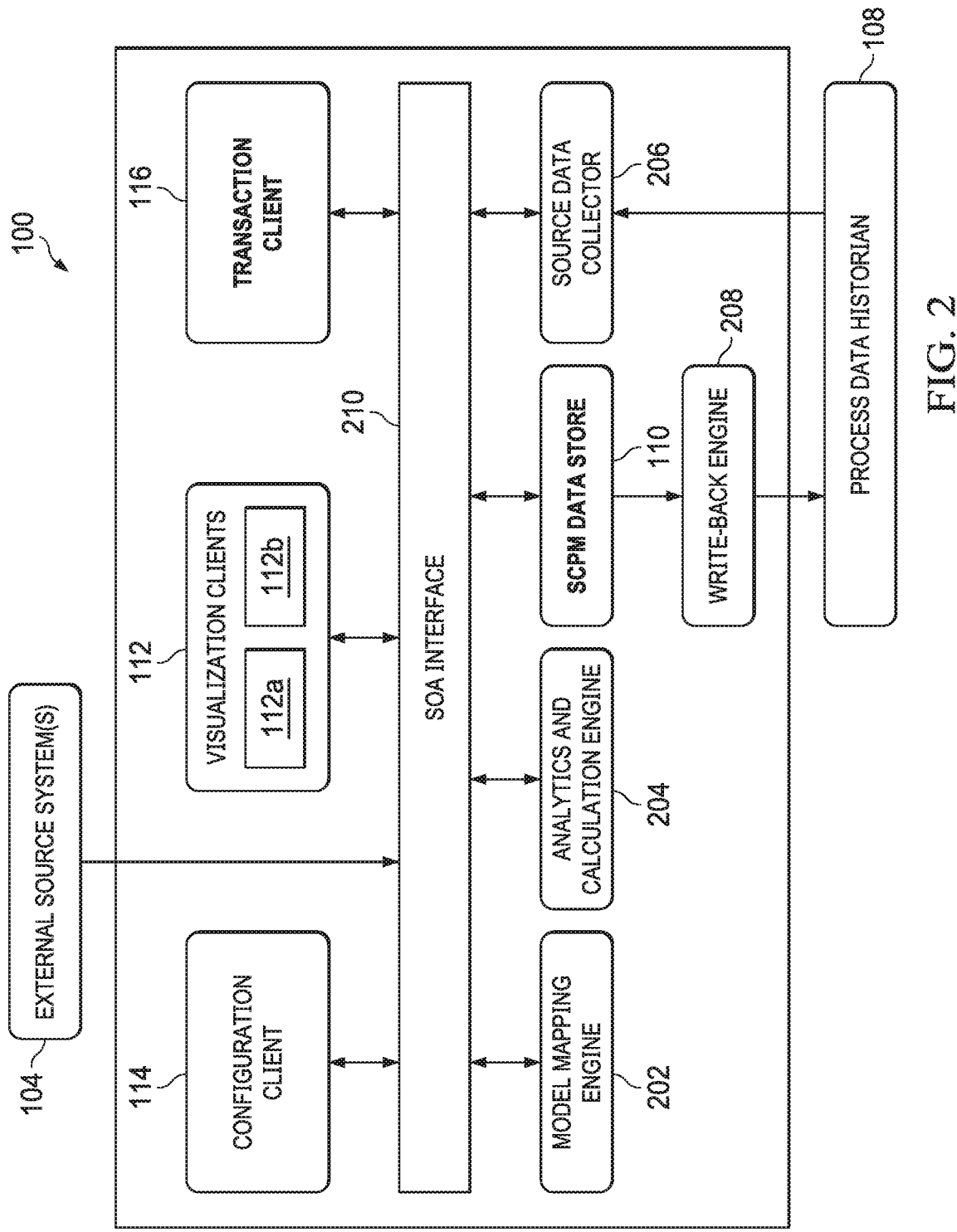
FIG. 2 illustrates details of high-level architectural components used to implement the system of FIG. 1 according to this disclosure.

FIG. 2 illustrates details of high-level architectural components used to implement the system 100 of FIG. 1 according to this disclosure. As shown in FIG. 2, the assimilation and workflow engine 106 includes multiple engine components, including a model mapping engine 202, an analytics and calculation engine 204, a source data collector 206, and a write back engine 208. The various components of the system 100, including the engines 202-208, are configured to communicate over an interface 210, which may include an SOA interface.

The model mapping engine 202 performs translations of data from source case models into the SCPM's unified data model. The translations are carried out by the model mapping engine 202 using the model mapping configurations. The translations could involve translating model item names from a source model to the SCPM model for a configured unit of measure (UoM), and aggregating or disaggregating data based on the time horizon of the source case and SCPM case periods.

The analytics and calculation engine 204 performs the report metric calculations. Each reporting metric expression can be defined by a user based on the user's metrics requirements. The metrics 122 can be calculated based on the expressions defined, and the inputs required for the expressions can be derived by the analytics and calculation engine 204. The results are exposed in the SOA interface 210 for the visualization clients 112.

The source data collector 206 is responsible for collecting data from some source systems, such as the process data historian 108 and the external source systems 104. The data can be collected at any suitable times, such as on a periodic basis or on-demand in response to certain events.

The write back engine 208 is configured to trigger the analytics and calculation engine 204 for metrics calculations and to write the metrics results into one or more external systems 120, the process data historian 108, or the SCPM data store 110 itself. The data can be consumed by other historian consumer applications for further usage. The write back engine 208 operates based on the write back configuration and its schedule frequency. In some embodiments, the write back engine 208 could include a continuously running background process or application.

In one aspect of operation, when an on-demand request comes from a visualization client 112, the assimilation and workflow engine 106 processes the request and looks for requested metrics 122. If needed, the analytics and calculation engine 204 pulls the needed translated data from the SCPM data store 110, and the requested metrics 122 are calculated and presented. The analytics and calculation engine 204 can also calculate metrics 122 automatically (such as on a configured frequency), store the metrics 122, and write the metrics 122 to the process data historian 108 through the write back engine 208.

The interface 210 allows communication and transfer of data between the components of the system 100. For example, the interface 210 could be a service-based interface through which the external source systems 104 can publish transactions through middleware, such as MICROSOFT BIZTALK. The interface 210 can include any suitable hardware and software for enabling communication and transfer of data between the components of the system 100. For example, the interface 210 could include one or more wired or wireless interfaces for communication via one or more wired or wireless networks.

In some embodiments, the system 100 is built on an SOA using WINDOWS COMMUNICATION FOUNDATION (WCF). WCF is a platform that allows the external source systems 104 to communicate with other components of the system 100, such as the assimilation and workflow engine 106. SOA provides services that can be consumed by WCF integration. Using SOA, the components of the system 100 can be loosely coupled, which helps to manage the components easily and allow upgrades or enhancements to individual components without affecting other components of the system 100. SOA also provides scalability for specific components, such as the analytics and calculation engine 204. In addition, SOA provides security isolation across the components, thereby simplifying security management. In these embodiments, the interface 210 can be an SOA interface, and the external source systems 104 can provide data through the SOA interface. In particular embodiments, the SOA interface 210 is implemented using micro-service architecture principles.

Figure 3:
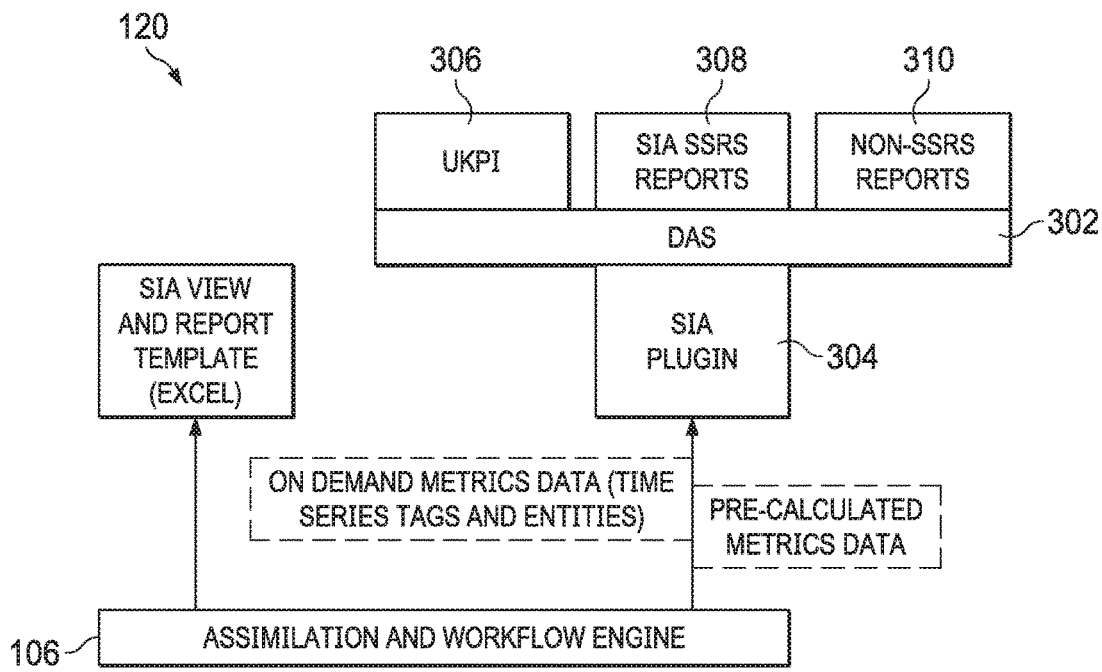
FIG. 3 illustrates additional details of the system of FIG. 1 for transaction with external systems according to this disclosure.

FIG. 3 illustrates additional details of the system 100 of FIG. 1 for transaction with external systems 120 according to this disclosure. In particular, FIG. 3 illustrates additional details of the system 100 that permit the external systems 120 (such as key processing indicators and reporting) to consume reporting metrics data and analytics from the system 100.

As shown in FIG. 3, the system 100 abstracts "data expose" mechanisms for integration with external systems 120, such as dashboards, report generators, and KPI (key performance indicator) systems. In some embodiments, the system 100 can leverage a Data Access Service (DAS) framework 302, which is part of the HONEYWELL INTUITION platform. The DAS framework 302 provides one or more plug-ins 304 to expose data to the external systems 120. The DAS framework 302 can use a leveraging service oriented architecture (such as WCF) and provides additional benefits like managing metadata about the data being exposed and configurations of the plug-ins 304. The plug-ins 304 expose on-demand metrics data such as DAS entries for reporting purposes. The plug-ins 304 also expose on-demand metrics data, such as time series tags for HONEYWELL's UNIFORMANCE KPI (UKPI) calculations. External systems, such as UKPI 306, SQL server reporting services (SSRS) 308, and non-SSRS 310, may rely on the DAS framework 302 to collect data without the knowledge of the plug-in 304 that provides the data.

Although FIGS. 1 through 3 illustrate one example of a system 100 for SCPM assimilation and workflow analytics and various details about the system 100, various changes may be made to FIGS. 1 through 3. For example, an SCPM assimilation and workflow analytics system could include any number of engines, clients, users, servers, and other components. Also, the makeup and arrangement of the system 100 is for illustration only. Components could be added, omitted, combined, further subdivided, or placed in any other suitable configuration according to particular needs. Further, particular functions have been described as being performed by particular components of the system 100. This is for illustration only. In general, data processing systems are highly configurable and can be configured in any suitable manner according to particular needs.

Figure 4:
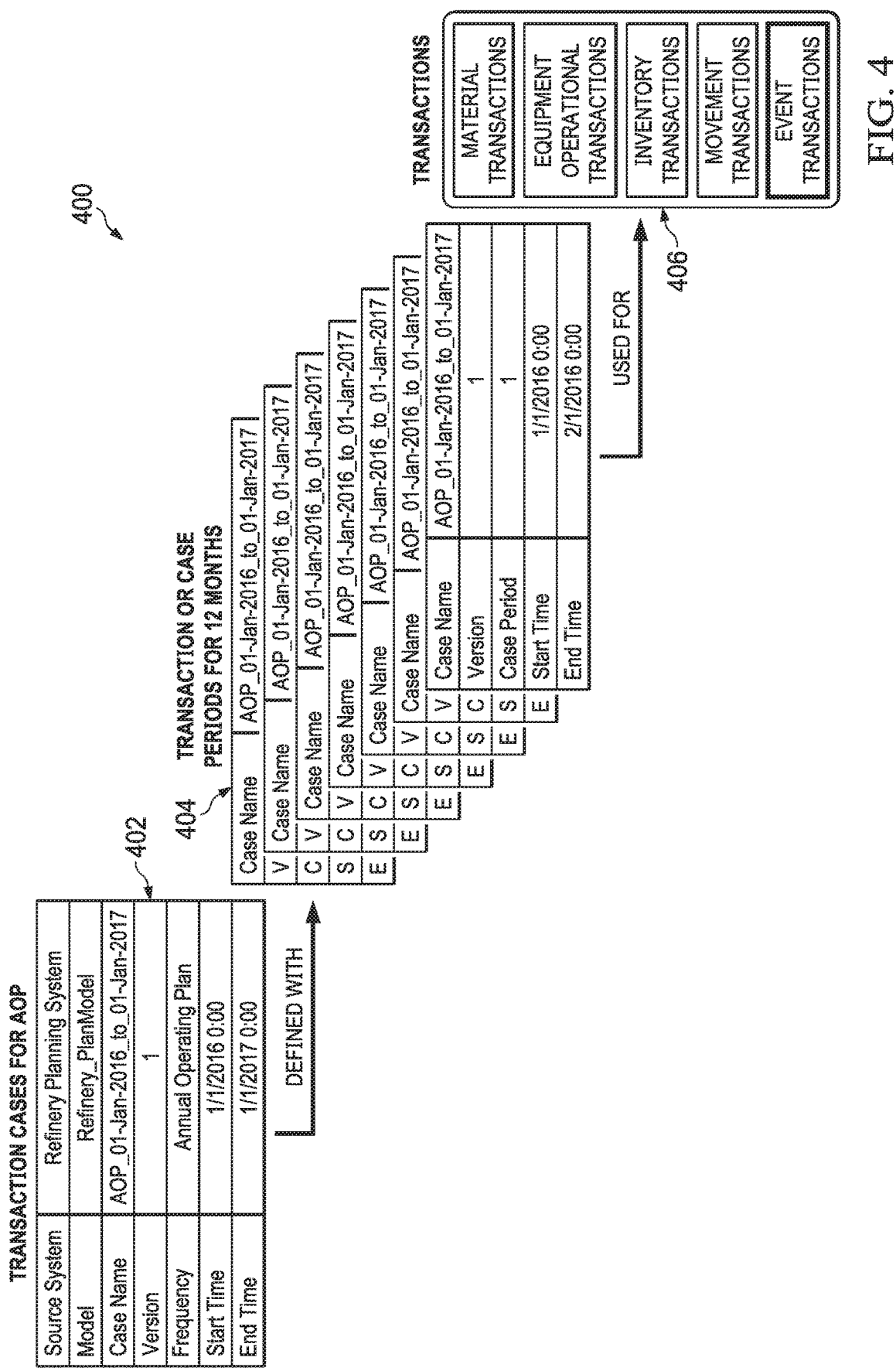
FIG. 4 illustrates an example process for handling transactions of external source systems that are published for different transaction intervals, according to this disclosure.

FIG. 4 illustrates an example process 400 for handling transactions of external source systems that are published for different transaction intervals, according to this disclosure. For convenience of discussion, the process 400 is described as being used in conjunction with the system 100 of FIG. 1. This is merely one example. The process 400 could be used with any other suitable system(s).

As shown in FIG. 4, the process 400 enables the creation of transactional cases for the external source systems 104. For example, a planning system 104a creates a transactional case 402 with a case name of AOP_01-Jan-2016_to_01-Jan-2017 to represent an Annual Operating Plan (AOP). In some embodiments, the transactional case 402 can be created with a case name, a version, a case frequency, a start time, an end time, and a status. The transactional case 402 can be version-controlled by revising its version number. Versioning of transactions ensure that the correct versions are provided for cross-functional usage across SCPM functional users. Also, the external source systems 104 (such as the planning system 104a) can declare the status of the transactional case 402. The status field can indicate the state of the transactional case 402, such as created, approved, etc. The transactional case 402 can include a time range or time period, such as a year period extending from Jan. 1, 2016 to Jan. 1, 2017. The first version of the transactional case 402 can be kept with a status of "Created," and the status can be changed to "Approved" after finalizing the transactional case 402.

The entire duration or time period configured for a transactional case could be split into multiple case periods based on the SCPM activity cycle of the plant, where each case period has its own case period number, start time, and end time. Each version of the transactional case can also have its own case periods. In FIG. 4, the transactional case 402 described above can be split into twelve consecutive case periods 404, each representing a plan horizon of one month. Case period #1 has a start time of Jan. 1, 2016 and an end time of Feb. 1, 2016, case period #2 has a start time of Feb. 1, 2016 and an end time of Mar. 1, 2016, and so on. Each case period can be separately stored in the SCPM data store 110.

The system 100 can accommodate and process SCPM operational transactions 406 from different types of external source systems 104 using a few standardized categories. Example categories of operational transactions 406 include material transactions, equipment operational transactions, inventory transactions, movement transactions, and event transactions. External systems 120 can publish these operational transactions 406 against a case period 404 by providing additional attributes for the transaction 406. The additional attributes could include attributes such as:

Material (name of the material dealt with in a transaction);
Equipment (name of the equipment involved in a transaction);
Operational type (to indicate what type of SCPM operation it corresponds to, like consumed, produced, shipped, etc.);
Movement type (like feed, shipment, run down, etc.); and
Material or Equipment Attribute Values with Unit of Measure (UoM) that was involved in the transaction.

For the above example, the planning system 104a can publish a Material transaction case for a case period from Jan. 1, 2016 to Feb. 1, 2016 (defined as case period #1) with the material as "Plan_FAME," the operational type as "Consumed" (to indicate it is a planned consumption), and a source system attribute "Plan_Mat_Qty" for planned material quantity with a value of "5 KTONNE" (see FIG. 5 described below).

When external systems 120 publish transactions, the assimilation and workflow engine 106 validates the transactions and imports the transactions as "Source" transactions. The assimilation and workflow engine 106 translates the source system transactions to a unified model built for assimilation. During the translation, the assimilation and workflow engine 106 looks for a model mapping to identify various attributes defined in the source system transactions, such as the attribute of the unified model mapped for the source system attribute, the material and equipment mapping, etc., after locating the mapping information. The transactions are translated and stored into the SCPM data store 110 with a state of "Translated". For the example of the material transaction above, after successful translation, the transaction could appear as shown in FIG. 5.

Although FIG. 4 illustrates one example of a process 400 for handling transactions, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

Figure 5:
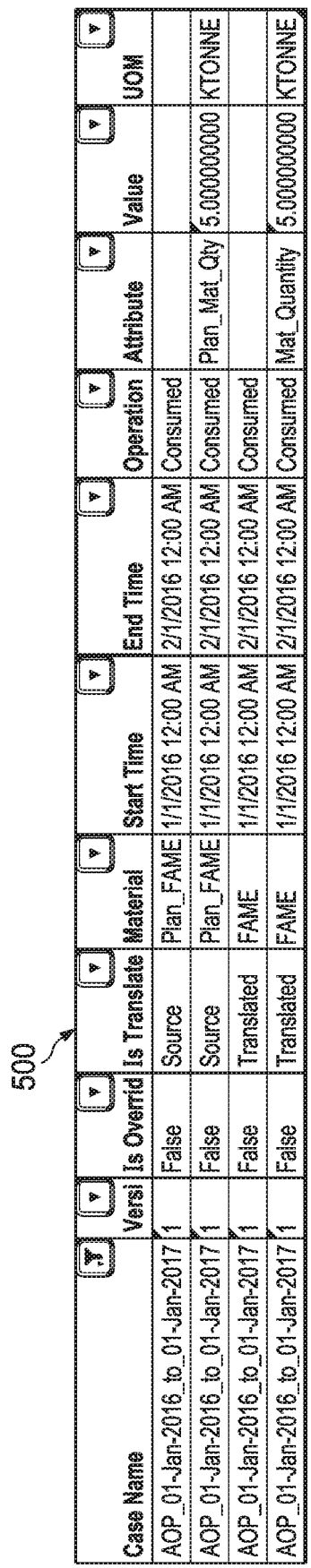
FIG. 5 illustrates a list of example transactions that are recorded in an SCPM data store of FIG. 1 according to this disclosure.

FIG. 5 illustrates a list of example transactions 500 that are recorded in the SCPM data store 110 according to this disclosure. As shown in FIG. 5, the planning system 104a has published the Fame consumption plan, and the assimilation and workflow engine 106 has imported this transaction from the planning system 104a and kept it as a "Source" transaction. The assimilation and workflow engine 106 found mapping information, such as (i) Plan_Mat_Qty of the planning system attribute mapped to Mat_Quantity of the unified model and (ii) planning system material Plan_FAME mapped to FAME of the unified model. Thus, the assimilation and workflow engine 106 successfully translated the transaction into the SCPM data store 110 and marked the transaction as "Translated."

Figure 6:
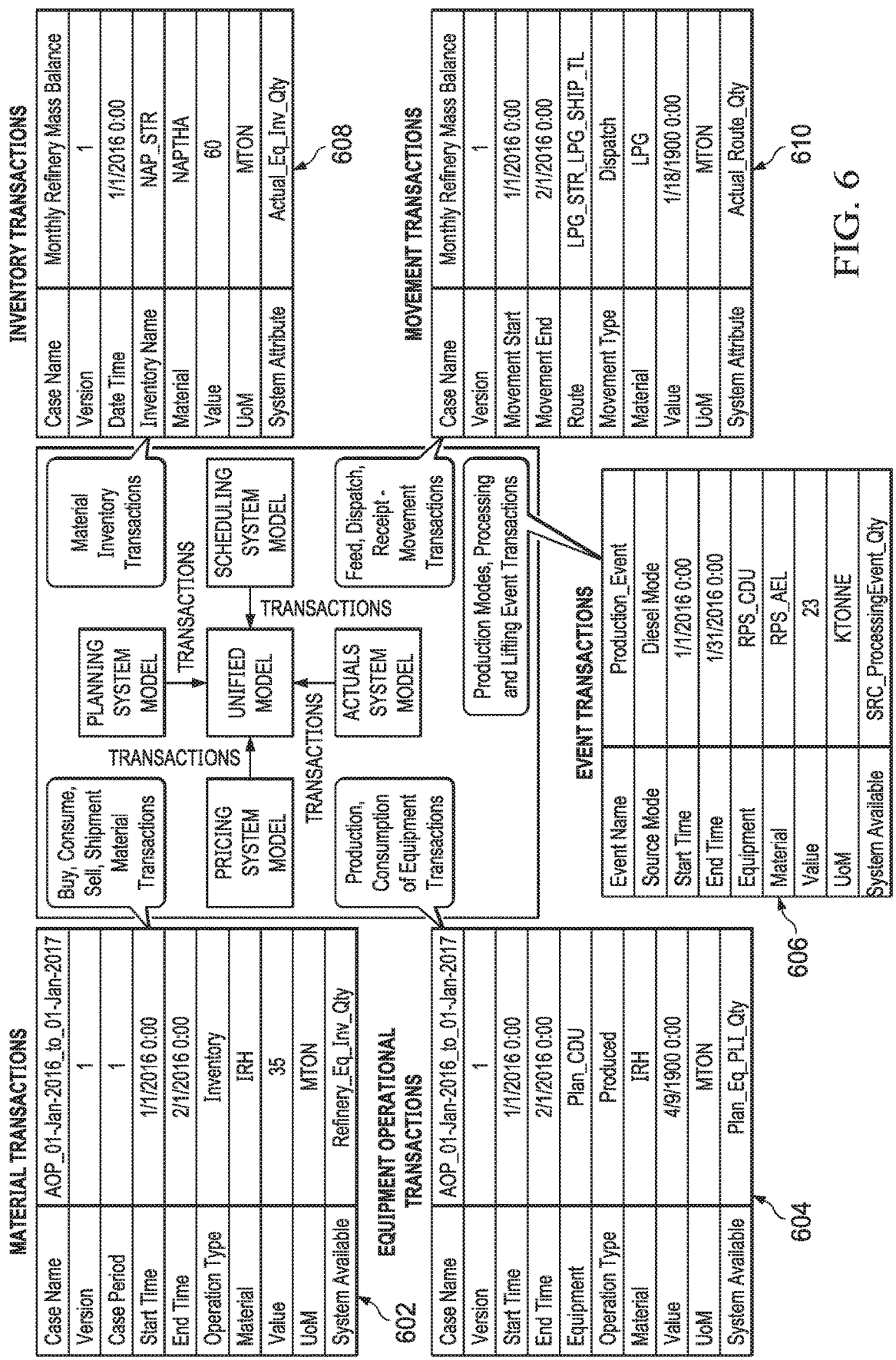
FIG. 6 illustrates other example types of transactions that may be published from different external source systems according to this disclosure.

Using these techniques, the system 100 processes transactions published from different source systems, translates them into the terms of the unified model, and saves into the SCPM data store 110. For example, FIG. 6 illustrates other example types of transactions that may be published from different external source systems 104 according to this disclosure. As shown in FIG. 6, the transactions can include material transactions 602 that are related to buying, consuming, selling, or shipping of materials; equipment operational transactions 604 that are related to production and consumption of equipment; event transactions 606 that are related to production mode changes, equipment outages, etc.; inventory transactions 608 that are related to material inventory; and movement transactions 610 that are related to feed, dispatch, and receipt related actual movement transactions.

Although FIGS. 5 and 6 illustrate examples of transactions, various changes may be made to FIGS. 5 and 6. For example, other types of transactions are possible, and transactions may include additional or alternative details.

Figure 7:
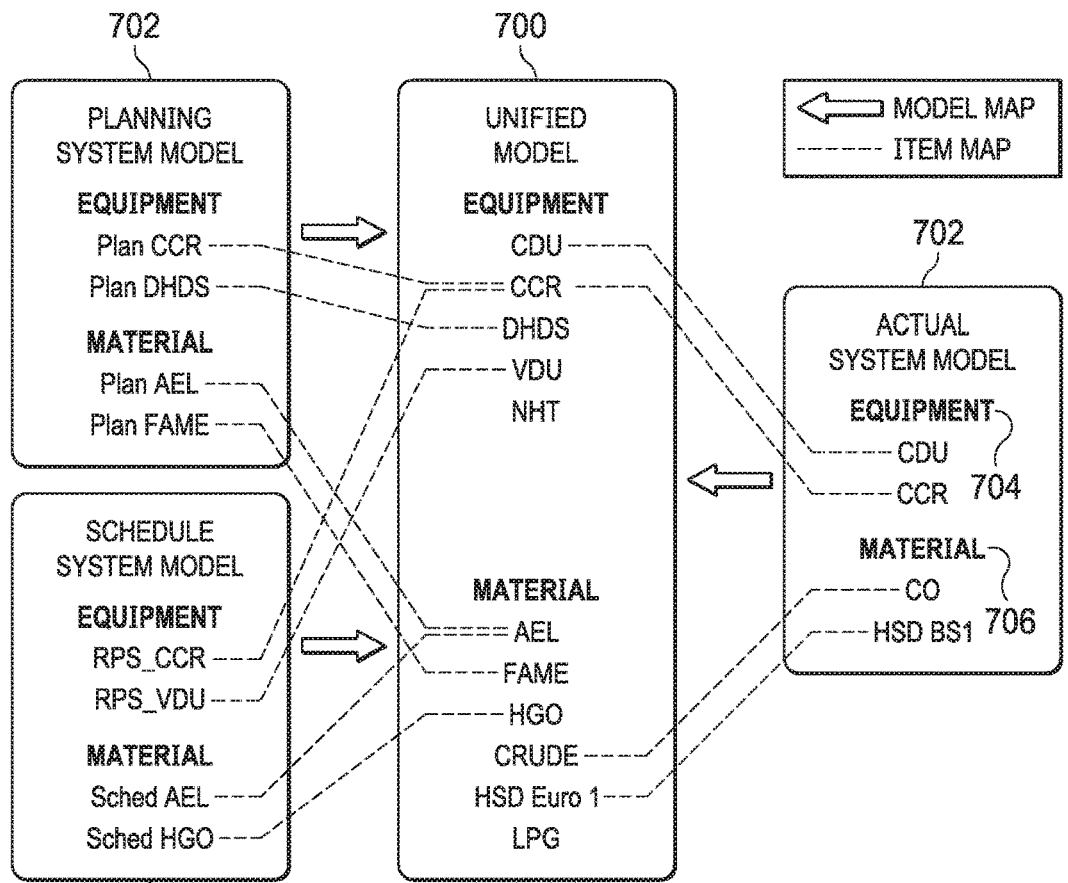
FIG. 7 illustrates an example of a unified model for the system of FIG. 1 according to this disclosure.

FIG. 7 illustrates an example of a unified model 700 for the system 100 according to this disclosure. As shown in FIG. 7, the unified model 700 is derived from a plurality of source system models 702. Each source system model 702 can represent one of the external source systems 104. Each source system model 702 includes its own equipment items 704 and material items 706. One or more attributes can be defined for the equipment items 704 and material items 706 of each source system model 702. In some embodiments, a hierarchy can be established for the equipment items 704 and material items 706 of each source system model 702.

To derive the unified model 700, the equipment items 704 and material items 706 for each source system model 702 are identified. Equipment items 704 can include processing units, storage units, loading/unloading equipment, and the like. Material items 706 can include raw material, additives, intermediate products, final products, and the like. Each item 704, 706 in the source system models 702 is mapped to a corresponding item in the unified model 700. Attributes (such as density, mass, volume, quantity transferred, design capacity, consumption, etc.) from the source system models 702 can be carried over to the unified model 700.

Likewise, any hierarchy or hierarchies that exist for the equipment items 704 and material items 706 of each source system model 702 can be defined in the unified model 700. Hierarchies establish parent-child relationships between equipment items and material items for later use by a user. Hierarchies of items are used by the user to assist in picking material or equipment for analytics. Hierarchies can be based on a physical association between items, a logical association between items, or both. Different hierarchies can exist for each of the source system models 702. Example hierarchies in a refinery might include Gasoline BS Grade-3 as a child of Gasoline, CDU1 as a child of Crude Distillation Unit, or total crude as a parent of crude grade 1, crude grade 2, and crude grade 3. In some embodiments, the configuration client 114 can be used to define the unified model.

Although FIG. 7 illustrates one example of a unified model, various changes may be made to FIG. 7. For example, unified models can come in a variety of configurations, and FIG. 7 does not limit this disclosure to any particular configuration of unified model.

Figure 8:
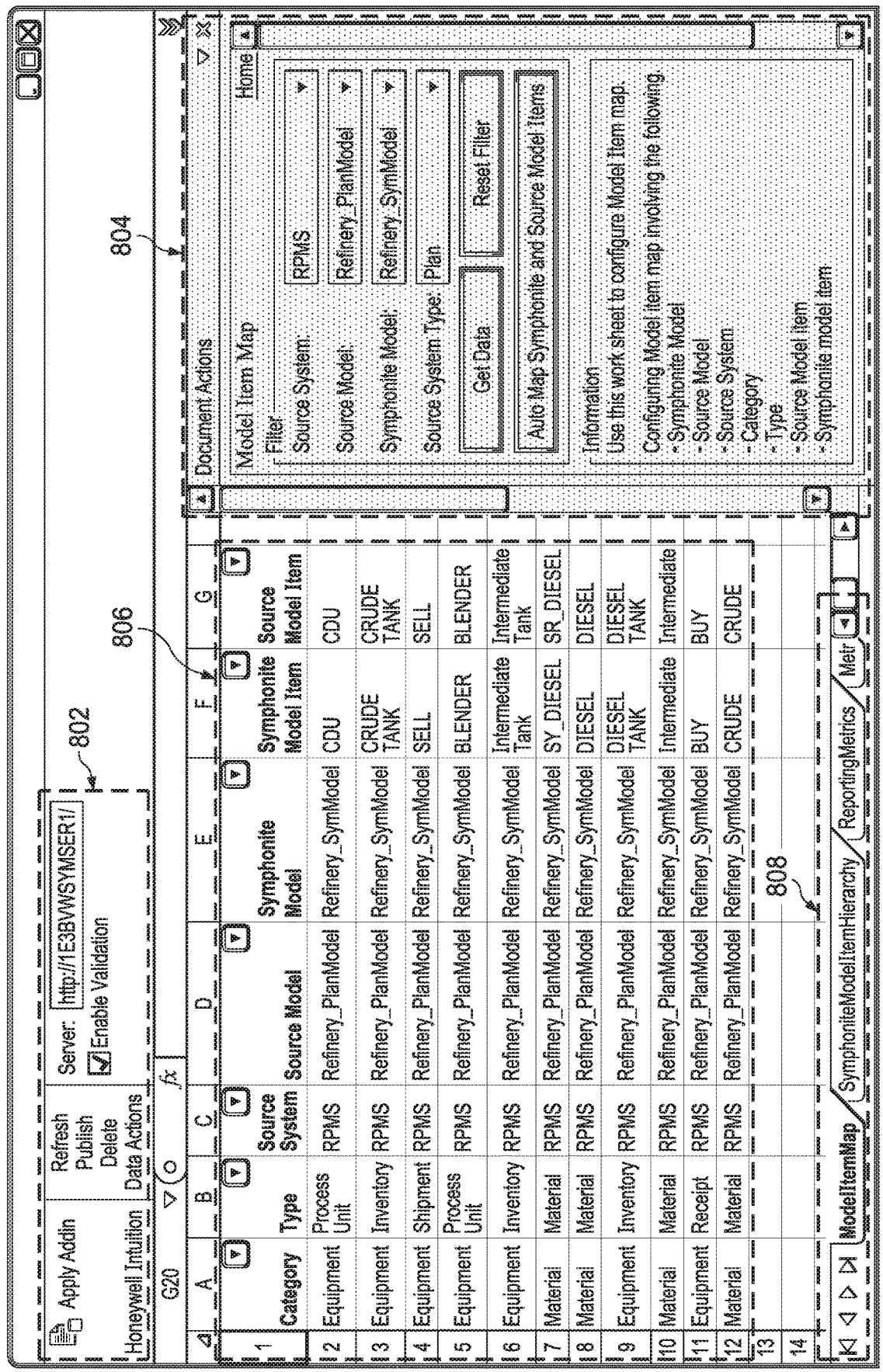
FIG. 8 illustrates an example user interface of a configuration client to build a unified model and metrics for analytics according to this disclosure.

FIG. 8 illustrates an example user interface of the configuration client 114 of FIGS. 1 and 2 according to this disclosure. Note that while the configuration client 114 illustrated in FIG. 8 is one example, other embodiments of the configuration client 114 are possible.

The configuration client 114 allows a user to provide various information about different external source systems 104. For example, the user could identify the external source systems 104, identify those systems' models with model items, and define mappings of the models and model items. The user could also define different hierarchies, metrics for analytics, and system attributes.

As shown in FIG. 8, the user interface of the configuration client 114 provides different configuration sheets for defining various configuration aspects. A common actions menu 802 provides common actions, such as connecting to a server, publishing a configuration, deleting a configuration, etc. A configuration actions pane 804 enables the user to carry out different actions, such as applying a filter and retrieving configuration data. Configuration data 806 corresponding to a selected configuration sheet 808 is shown in the main display area. The user can view, modify, add, and delete configuration data 806. After the same, from the common actions menu 802, the user can publish those changes to the SCPM data store 110.

Figure 9A:
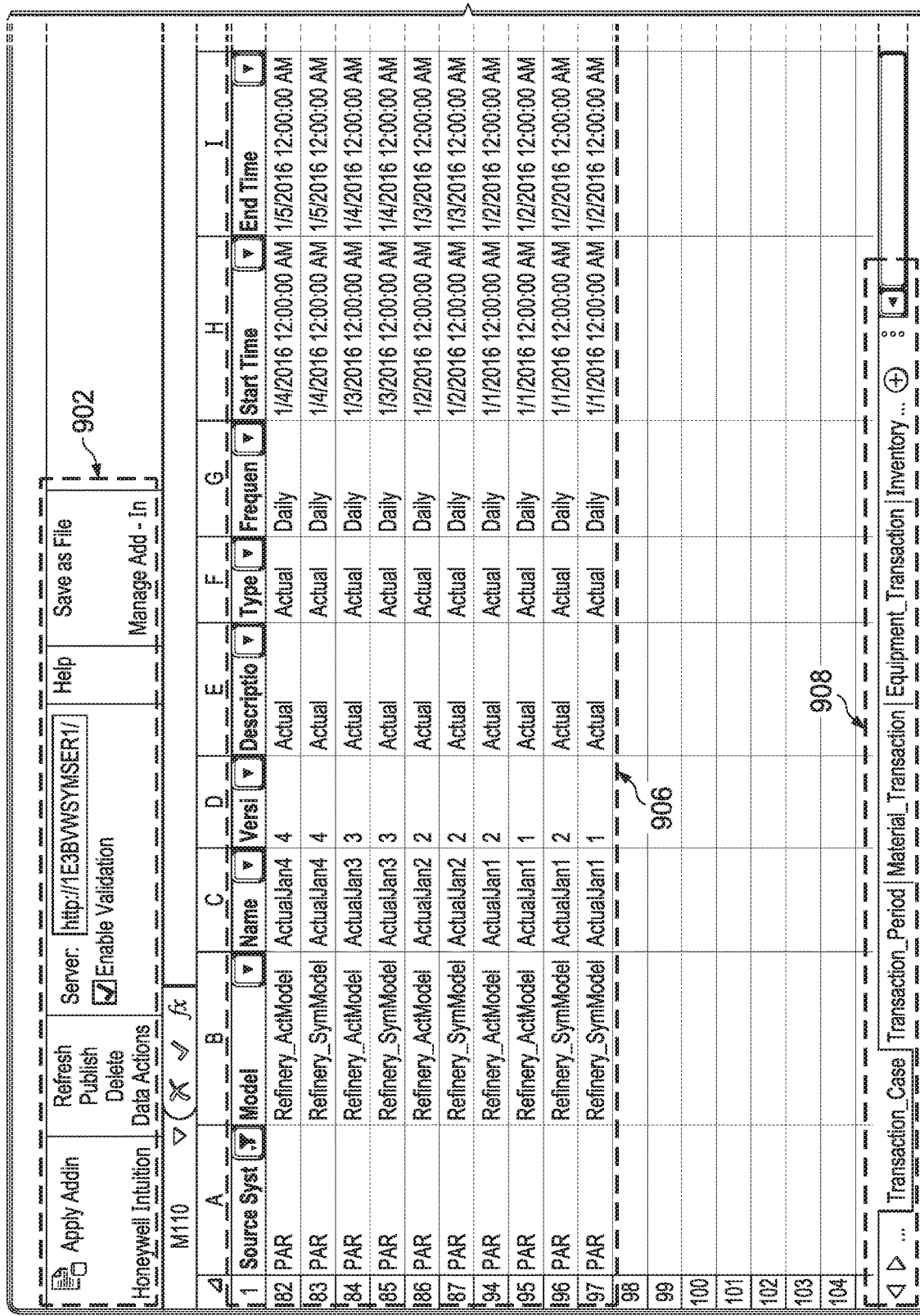

FIGS. 9A and 9B illustrate an example user interface of a case configuration client 900 to monitor the transactions that are published by the external systems according to this disclosure. While the case configuration client 900 is a particular type of configuration client 114, the case configuration client 900 illustrated in FIGS. 9A and 9B is merely one example, and other embodiments of the case configuration client 900 are possible.

The case configuration client 900 allows a user to view different transactions that were published by external source systems 104. For example, the user could specify a time period and receive transactions published during that time period. The user interface of the case configuration client 900 in FIGS. 9A and 9B is similar to the user interface of the configuration client 114 in FIG. 8. For example, the case configuration client 900 can include a common actions menu 902, a configuration actions pane 904, and configuration data 906. Different types of transactions can be provided in different transactional data sheets 908. The configuration actions pane 904 provides actions corresponding to the transaction sheet 908 selected, allowing the user to specify data like time range, case name, and case versions to query the transactions.

Although FIGS. 8 and 9 illustrate example user interfaces, various changes may be made to FIGS. 8 and 9. For example, user interfaces can come in a variety of configurations, and FIGS. 8 and 9 do not limit this disclosure to any particular configuration of user interface.

Workflow Analytics and Visualization

The workflow of SCPM activities is typically a very complex process for multiple reasons. For example, trying to generate a visualization of SCPM function data for a user of a different function is typically an arduous task since different SCPM functions often have their own tools and their own models built into the tools. Different SCPM functions can also use different plan horizons for planning, scheduling, and actual monitoring, and functional users may need to apply an appropriate level of aggregation to derive accurate results.

Thus, there may be a need or desire to ensure availability of a wide range of analytics data to functional users who use and evaluate the data before making complex decisions or taking complex actions. There may also be a need or desire to standardize workflow analytics and various performance metrics in order to meet the requirements of different functional users. In addition, there may be a need or desire to capture assimilated data from various external systems of SCPM operations in a required format.

To address these and other issues, the system 100 supports common visualization and analytics for different SCPM functions for use by various functional users. As used here, "analytics" refers to views or snapshots of data and metrics that are organized to facilitate understanding by users of SCPM operations or functions. Each analytic typically includes at least one metric and is associated with at least one reporting interval and at least one material and/or equipment. A particular example of an analytic is a comparison of monthly sales of different diesel grades to see whether actual sales are on track with planned values.

Figure 10:
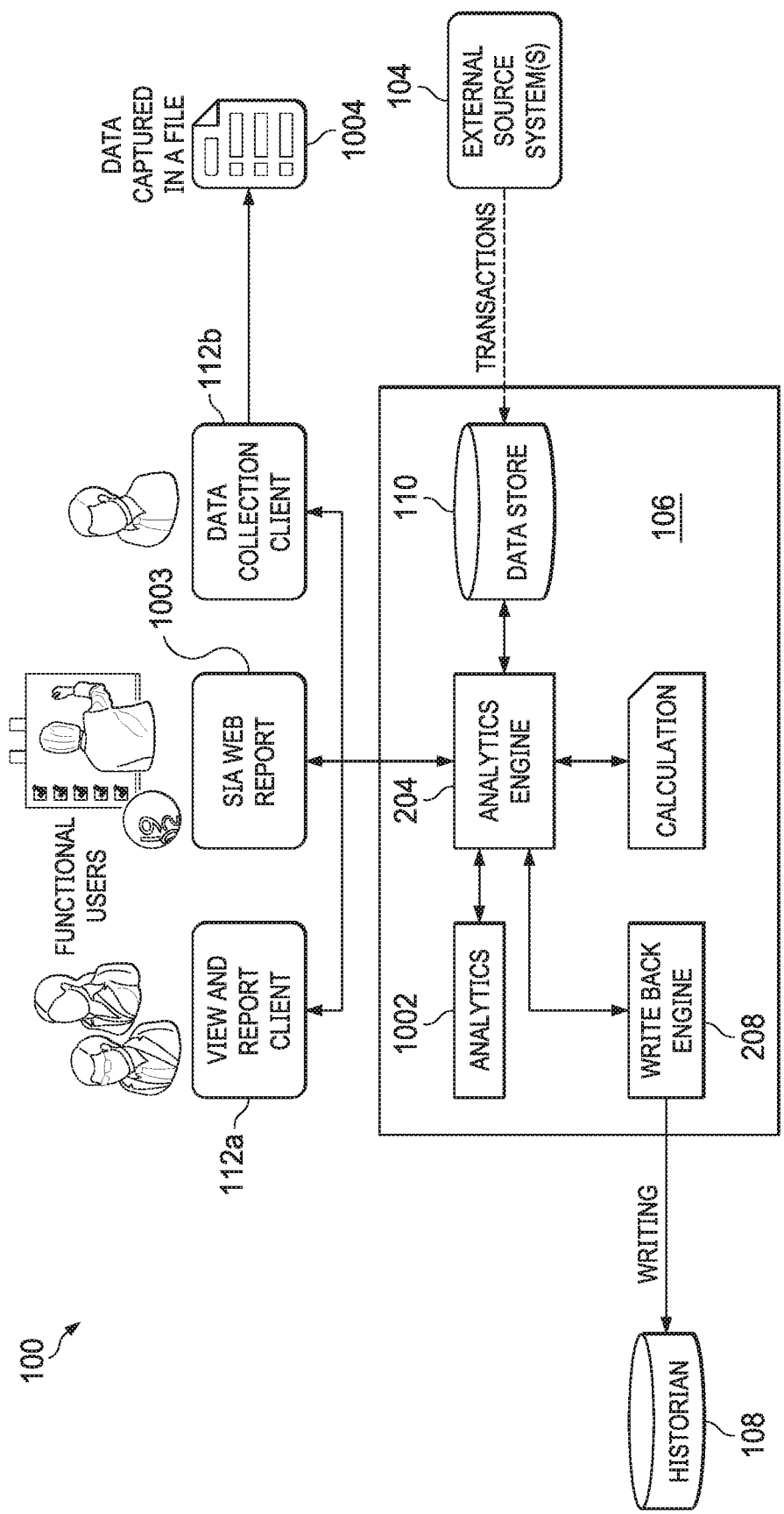
FIG. 10 illustrates additional details of the system of FIG. 1 in handling the requests from the clients for use in common visualization and collection of analytics data from the system of FIG. 1, according to this disclosure.

FIG. 10 illustrates additional details of the system 100 for use in common visualization and collection of analytics data according to this disclosure. As discussed above, the system 100 provides a common visualization environment and infrastructure for different types of views of analytics 1002 associated with a large number of SCPM activities. Moreover, the system 100 supports various modes of data views to meet different functional user expectations. Further, the system 100 enables collaboration among various functional users on the SCPM activities. These views can be accessed from one or more of the visualization clients 112, such as the view and report client 112a and the data collection client 112b. Additional views of data can be generated as one or more web-based reports 1003 or captured in one or more files 1004, such as a flat file, spreadsheet file, or database file.

The visualization clients 112, the reports 1003, and the files 1004 can be fully customizable and enable a user to define the formats and styles for capturing data from the SCPM data store 110. Among other things, this allows for faster decision-making due to better visualizations of SCPM functions, which can enable improved control of industrial processes and improved profitability.

The view and report client 112a provides a common visualization for functional users to the data in the SCPM data store 110. The common visualization can be realized through different interfaces, including a website-based interface and a mobile device-based interface. The view and report client 112a enhances the ability of the user to visually interpret the correct versions of external source system transactions. Support for hierarchical relationship of entities and the application of the correct degree of aggregation (or disaggregation) over a transaction period helps to ensure correct application of the analytics 1002.

In addition, the view and report client 112a can include or support any one or more of the following features:
Exclusive analytics 1002 for special model items.
Periodic and on-demand calculations of analytical metrics from the SCPM data store 110.
Multiple modes of visualization, including time-based and case-based monitoring of metrics of plan versus actual.
Comparison views to track the evolution of required plans from any of the external source systems 104.
Visualizations of metrics that are compatible with the chosen external source system 104.
Collaboration on common visualizations, such as support to normalize report templates, capture analysis, and review workflows for cross-functional use.
Capability to store analytics data and expose it to external historians 108.
Service-based rendering of analytics 1002 to external source systems 104.
Capability to notify users about deviations in one or more analytics 1002.
A review visualization environment for recurrence of a prior experience.
A persistence mode that allows the user to bring conditions back to a same state where a user previously left them.
A smart abet mode for analytics (such as new diagnostics, which pulls raw data, indicates applied aggregation, etc.).
Support for combined external source system data for metric calculation (such as using data from pricing systems in plan or actual systems).

The data collection client 112b provides user-configurable formats for data collection for different functions from the unified model 700 (such as per metric sheet, multi-metric sheets, combining metrics, per interval sheet, or multi-interval sheets, and the like). The data collection client 112b supports pervasion (such as infusing) of model items for data collection (such as by combining data from different systems together, like price metrics with sales metrics). The data collection client 112b also supports application of correct aggregation or disaggregation weight factors when collecting the data. The data collection client 112b allows users to pick required intervals for data collection and can validate the data collected (such as by validating data ranges, missing expected data, no data, etc.). Data collection can be initiated from and data can be sent to different receivers, including web clients and mobile devices.

FIG. 11 illustrates an example method 1100 for processing an analytics metric according to a request from a user, according to this disclosure. For ease of explanation, the method 1100 is described in conjunction with the system 100. Of course, this is merely one example, and the method 1100 could be used with any other suitable system.

As shown in FIG. 11, the method 1100 is for processing a Plan versus Actual 'Capacity Utilization' analytic, which represents an extent or level to which one or more processing units of a plant are being used in manufacturing. In particular, both a Capacity Utilization (Plan) metric 1108 and a Capacity Utilization (Actual) metric 1114 can be calculated for the analytic. In order to calculate the Capacity Utilization (Plan) metric 1108 of a unit, the system 100 obtains equipment operational transactions 1102. The equipment operational transactions 1102 are used to derive the Unit Throughput (Plan) metric 1104, which gives a total quantity processed or produced by that unit, and a Design Capacity metric 1106, which gives a producing or processing capacity of the unit per its design limits. The Unit Throughput (Plan) metric 1104 and Design Capacity metric 1106 are used as input data. The calculation of the Capacity Utilization (Plan) metric 1108 can be given by the expression:

$$\text{Capacity Utilization(Plan)} = \text{Unit Throughput(Plan)} / \text{Design Capacity}.$$

In response to receiving a request for a Capacity Utilization (Plan) metric 1108 for a specific equipment unit and for a requested time range, the system 100 attempts to derive the value for each of the calculation variables by processing transactional data in the SCPM data store 110.

In this case, for the Unit Throughput (Plan) metric 1104, the system 100 looks for equipment operational transactions 1102 in the SCPM data store 110, obtains all of the transactions from the planning system 104a with an operation type of "consumed," identifies the material feed planned for processing for that unit during the requested time range, applies the required aggregation (such as summation), and processes the data to get the desired value. To derive the Design Capacity metric 1106, the system 100 looks for the equipment operation transactions in the SCPM data store 110 and obtains the value of a constant, which gives the value of the Design Capacity metric 1106. Using these two values, the system 100 initiates the calculation with the above expression to get the Capacity Utilization (Plan) metric 1108.

In the same way, the Capacity Utilization (Actual) metric 1114 can be calculated based on the Unit Throughput (Actual) metric 1112, which can be determined from actual movement transactions 1110 in the SCPM data store 110 by pulling the transactions of the accounting system with an operation type of "feed," identifying the actual material feed for the unit during the requested time range, and dividing this by the Design Capacity metric 1106. The calculated planned versus actual values can be provided for the request. The calculated values can be displayed on a user interface or in a report in a format defined by the Plan versus Actual 'Capacity Utilization' analytic.

Although FIG. 11 illustrates one example of a method 1100 for processing an analytics metric, various changes may be made to FIG. 11. For example, while shown as a series of steps, various steps shown in FIG. 11 could overlap, occur in parallel, occur in a different order, or occur multiple times. Moreover, some steps could be combined or removed and additional steps could be added according to particular needs.

Figure 12B:
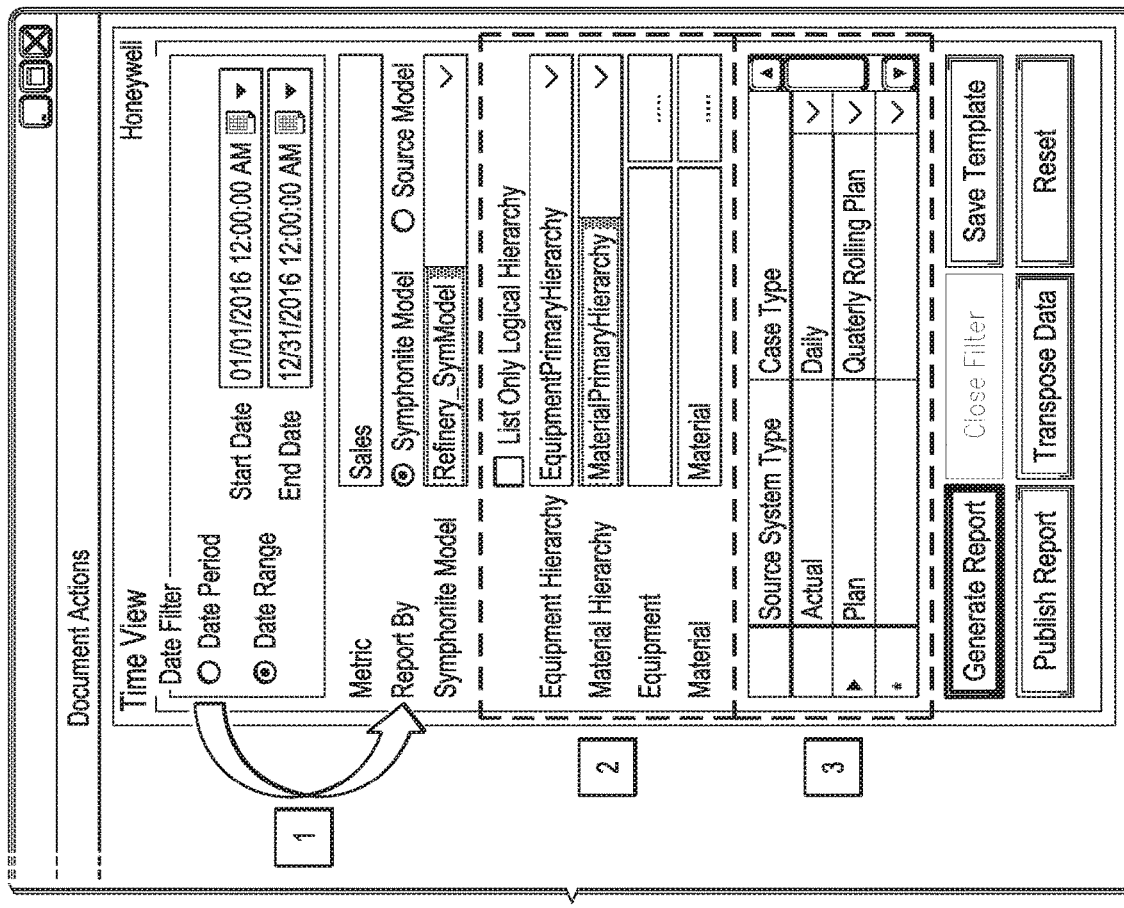

FIGS. 12A and 12B illustrate an example user interface 1200 showing a Time View of analytics according to this disclosure. As shown in FIGS. 12A and 12B, the user interface 1200 for the Time View allows a user to monitor planned versus actual values of one or more selected metrics over a specified time range. One example use of this view is to help an operational team track whether metrics of analysis are on the right track (the actual values are in line with the planned values to meet one or more goals). In the user interface 1200, the user has selected a time range (the year 2016) and a metric (Sales) in step 1 and then selected a specified equipment or material filter for the metric in step 2. Finally, the user has selected a reporting interval and available case types in step 3 to get the time view.

Figure 13B:
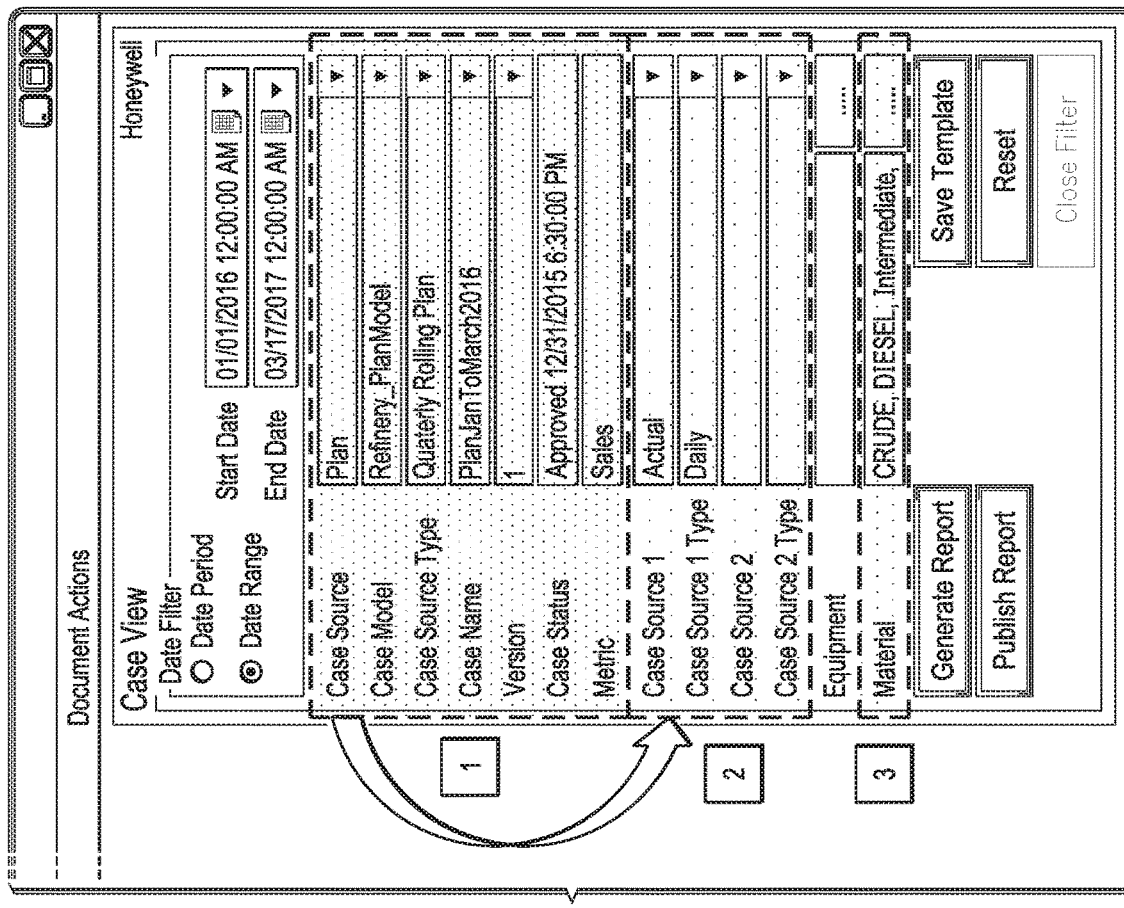

FIGS. 13A and 13B illustrate an example user interface 1300 showing a Case View of analytics according to this disclosure. As shown in FIGS. 13A and 13B, the user interface 1300 for the Case View allows a user to view and compare planned versus actual versus schedule values of one or more metrics for a selected transactional case published by one or more external source systems 104. One example use of this view is to help a planner view the actual values of analysis metrics (e.g., values published by an actuals system on a daily basis) against a selected version of a plan (in this case shown in FIGS. 13A and 13B, its Quarterly Operating Plan). In the user interface 1300, a user has selected a time range and a particular version of a plan available in that time range, along with the metrics to be seen for planned versus actual values in step 1. The user selected required actual cases in step 2 and an applicable equipment or material filter for the metrics in step 3 to get the case view.

FIGS. 14A and 14B illustrate an example user interface 1400 showing a Compare View of analytics according to this disclosure. As shown in FIGS. 14A and 14B, the user interface 1400 for the Compare View allows a user to compare different plans (or actuals or schedules) with one or more metrics. One example use of this view is to allow a planner to pick different versions of a plan that were published by a planning system 104a and see how the plan was revised. In the user interface 1400, a user has selected a time range and a particular version of a plan available in that time range along with the metrics to be seen for planned versus actual values in step 1. The user selected required actual cases in step 2 and an applicable equipment or material filter for the metrics in step 3 to get the compare view.

Although FIGS. 12A through 14B illustrate examples of user interfaces, various changes may be made to FIGS. 12A through 14B. For example, user interfaces can come in a variety of configurations, and FIGS. 12A through 14B do not limit this disclosure to any particular configuration of user interface.

Figure 15:
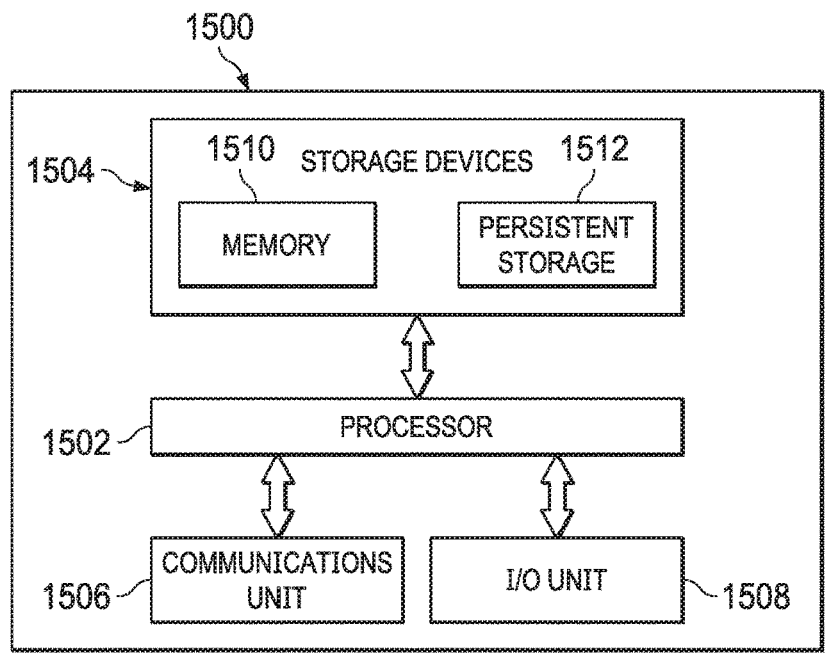
FIG. 15 illustrates an example device for performing all or a portion of any of the functions, methods, or processes according to this disclosure.

FIG. 15 illustrates an example device 1500 for performing all or a portion of any of the functions, methods, or processes according to this disclosure. The device 1500 could, for example, denote any of the components of the system 100, such as any of the external source systems 104, clients 112-114, or assimilation and workflow engine 106. As a particular example, the device 1500 could denote at least one computing device used to implement the method 1600 described below.

As shown in FIG. 15, the device 1500 includes at least one processing device 1502, at least one storage device 1504, at least one communications unit 1506, and at least one input/output (I/O) unit 1508. The processing device 1502 executes instructions that may be loaded into a memory 1510, such as instructions that (when executed by the processing device 1502) implement one or more of the processes and functions described in this document. The processing device 1502 includes any suitable number(s) and type(s) of processors or other devices in any suitable arrangement. Example types of processing devices 1502 include microprocessors, microcontrollers, digital signal processors, field programmable gate arrays, application specific integrated circuits, and discrete circuitry.

The memory device 1510 and a persistent storage 1512 are examples of storage devices 1504, which represent any structure(s) capable of storing and facilitating retrieval of information (such as data, program code, and/or other suitable information on a temporary or permanent basis). The memory device 1510 may represent a random access memory or any other suitable volatile or non-volatile storage device(s). The persistent storage 1512 may contain one or more components or devices supporting longer-term storage of data, such as a read only memory, hard drive, Flash memory, or optical disc.

The communications unit 1506 supports communications with other systems or devices. For example, the communications unit 1506 could include a network interface card or a wireless transceiver facilitating communications over a wired or wireless network. The communications unit 1506 may support communications through any suitable physical or wireless communication link(s).

The I/O unit 1508 allows for input and output of data. For example, the I/O unit 1508 may provide a connection for user input through a keyboard, mouse, keypad, touchscreen, or other suitable input device. The I/O unit 1508 may also send output to a display, printer, or other suitable output device.

Although FIG. 15 illustrates one example of a device 1500 for performing all or a portion of any of the functions, methods, or processes described herein, various changes may be made to FIG. 15. For example, computing devices come in a wide variety of configurations, and FIG. 15 does not limit this disclosure to any particular computing device.

Figure 16:
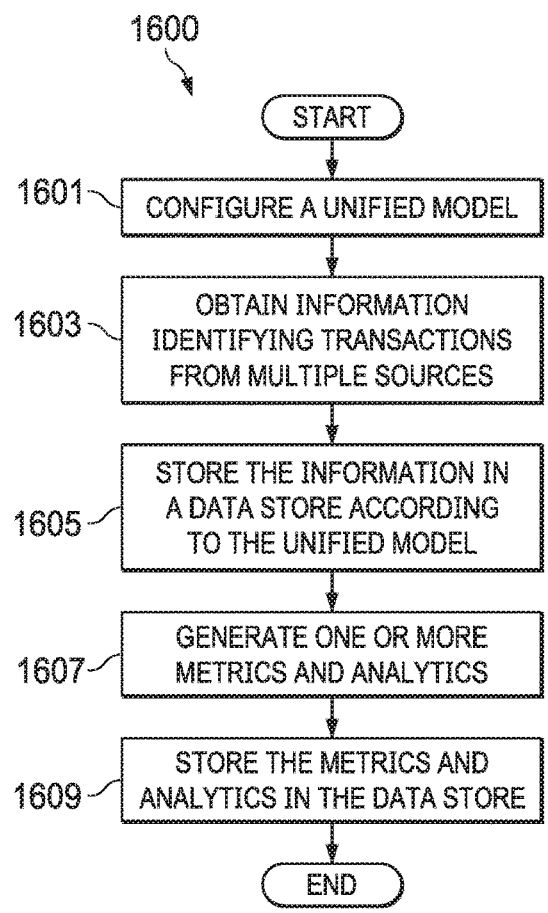
FIG. 16 illustrates an example method for SCPM assimilation according to this disclosure.

FIG. 16 illustrates an example method 1600 for SCPM assimilation according to this disclosure. For ease of explanation, the method 1600 may be described as being performed using a computing device (such as the device 1500 of FIG. 15 discussed above), which could be used to implement various components in FIG. 1. However, the method 1600 could be used with any suitable device or system.

At step 1601, a unified model is configured. This may include, for example, configuring a unified model 700. In some embodiments, the unified model can be configured by obtaining a source system model (such as a source system model 702) for each of multiple sources (such as multiple ones of the external source systems 104). One or more equipment items (such as equipment items 704) and material items (such as material items 706) for each source system model are identified. Each of the identified equipment items and material items is mapped to a corresponding item in the unified model. At least one hierarchy between two or more of the identified equipment items and material items is defined.

At step 1603, information identifying transactions from multiple sources is obtained. The transactions are related to multiple functional domains of a supply chain associated with at least one industrial process. This may include, for example, obtaining information from multiple ones of the external source systems 104. In some embodiments, the information identifying each transaction can include version information of the transaction.

At step 1605, the information is stored in a data store according to a unified model. The unified model represents all of the multiple sources. The data store includes a common relational database that consolidates the information from the multiple sources This may include, for example, storing information in the SCPM data store 110 according to the unified model 700. In some embodiments, the information from the multiple sources is communicated to the unified model using an SOA-based interface. Also, in some embodiments, at least one of the identified transactions includes a transactional case having a case time period. In such embodiments, the case time period of the transactional case can be divided into multiple consecutive case periods, and information associated with each case period can be separated stored in the data store.

At step 1607, one or more user-defined metrics and one or more user-defined analytics are generated using the obtained information. This may include, for example, generating one or more metrics 122 and one or more analytics 1002 as described above. At step 1609, the metrics and the analytics are stored in the data store. This may include, for example, storing the metrics 122 and the analytics 1002 in the SCPM data store 110.

Although FIG. 16 illustrates one example of a method 1600 for SCPM assimilation, various changes may be made to FIG. 16. For example, while shown as a series of steps, various steps shown in FIG. 16 could overlap, occur in parallel, occur in a different order, or occur multiple times. Moreover, some steps could be combined or removed and additional steps could be added according to particular needs.

Figure 17:
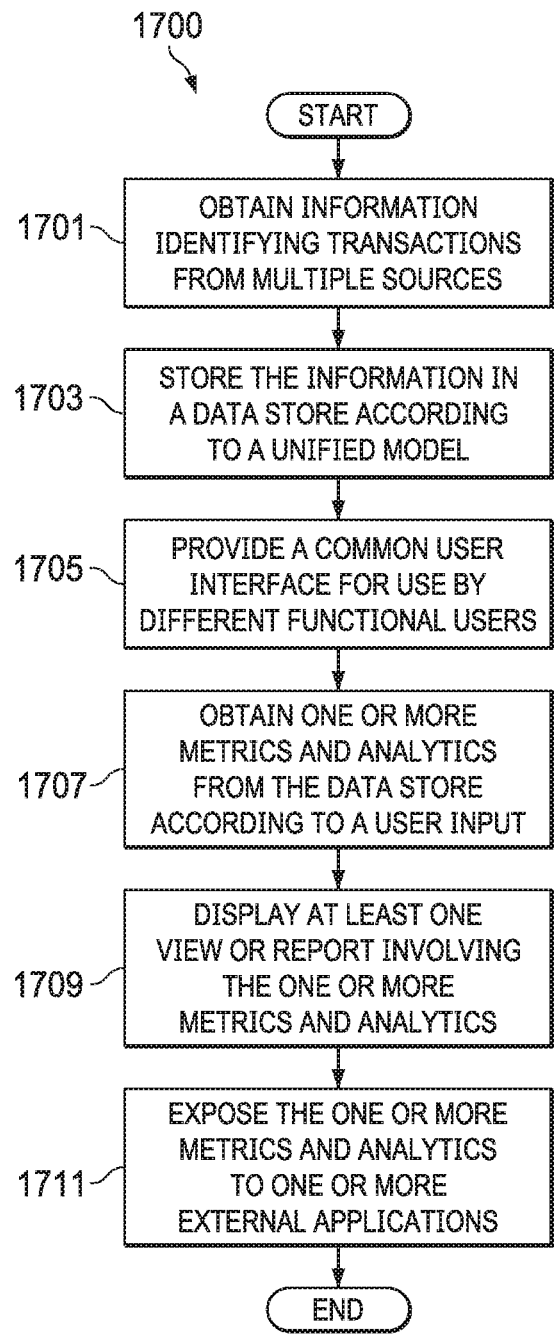
FIG. 17 illustrates an example method for workflow analytics and visualization according to this disclosure.

FIG. 17 illustrates an example method 1700 for workflow analytics and visualization according to this disclosure. For ease of explanation, the method 1700 may be described as being performed using a computing device (such as the device 1500 of FIG. 15 discussed above), which could be used to implement various components in FIG. 1. However, the method 1700 could be used with any suitable device or system.

At step 1701, information identifying transactions from multiple sources is obtained. The transactions are related to multiple functional domains of a supply chain associated with at least one industrial process. This may include, for example, obtaining information from multiple ones of the external source systems 104.

At step 1703, the information is stored in a data store according to a unified model. The unified model represents all of the multiple sources. The data store includes a common relational database that consolidates the information from the multiple sources This may include, for example, storing information in the SCPM data store 110 according to the unified model 700.

At step 1705, a common user interface is provided for use by different functional users. The common user interface is configured to display multiple views and multiple reports associated with the transactions. This may include, for example, providing a user interface at the view and report client 112a, the data collection client 112b, or another suitable visualization client. In some embodiments, the common user interface is configured as a website or an application for a mobile device.

At step 1707, one or more metrics and one or more analytics are calculated or obtained from the data store according to a user input at the common user interface. The metrics and analytics are associated with the obtained information. This may include, for example, obtaining one or more metrics 122 or analytics 1002 from the SCPM data store 110. Depending on the user request, the analytics can include a view of the metrics over a period of time (such as shown in FIGS. 12A and 12B) and at a requested interval using a time format associated with a time zone of a client machine, a comparison of planned values versus actual values for the metrics (such as shown in FIGS. 13A and 13B), a comparison of two or more plans or schedules associated with the metrics (such as shown in FIGS. 14A and 14B), any other suitable analytics, or a combination of two or more of these.

At step 1709, based on the user input, the common user interface displays at least one view or report involving the metrics and analytics in a requested unit of measure for a requested reporting interval. This can include, for example, the view and report client 112a or the data collection client 112b displaying a user interface that includes one or more metrics 122 or analytics 1002 in a requested unit of measure for a requested reporting interval. In some embodiments, in order for the common user interface to display the view or report, a computing device may obtain a subset of the information from the data store (such as the subset of the information can be related to different ones of the multiple sources), calculate values for the metrics using the subset of information, and configure the common user interface to display the calculated values for the metrics in a format defined by the analytics using an equipment or material filter selected for the one or more metrics.

In some embodiments, the one or more metrics and analytics are user-defined. In such embodiments, the method 1700 can also include step 1711, in which the metrics and analytics are exposed to one or more external applications. For example, a second common user interface can be provided that is configured to display data and receive user input associated with defining the user-defined metrics and analytics. This may include, for example, executing a configuration client 114 that displays a user interface to allow a user to define one or more metrics and analytics.

Although FIG. 17 illustrates one example of a method 1700 for workflow analytics and visualization, various changes may be made to FIG. 17. For example, while shown as a series of steps, various steps shown in FIG. 17 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for workflow analytics and visualization of assimilated supply chain and production management activities for an industrial process control and automation system, the method comprising:

obtaining information identifying transactions from multiple sources including information from external source systems, the transactions related to multiple functional domains of a supply chain associated with at least one industrial process in the industrial process control and automation system, the step of obtaining includes configuring a unified model based on source system models for each of the external source systems and based on one or more equipment of the industrial process control and automation system, wherein the unified model is configured using a configuration tool by integrating the source system models of the external source systems and mapping of the one or more equipment with the unified model;

storing the information in a data store according to the unified model, the unified model representing all of the multiple sources, wherein the data store includes a common relational database that consolidates the information from the multiple sources;

providing a common user interface for different functional users, the common user interface operated by a computing device and configured to display multiple views, reports and visualizations associated with the transactions;

obtaining, according to a user input at the common user interface, one or more metrics and one or more analytics from the data store, the one or more metrics and the one or more analytics associated with the obtained information, includes viewing the metrics, wherein the one or more analytics comprise a visualization of the one or more metrics over a period of time and at a requested interval using a time format associated with a time zone of a client machine; and configuring using a customizable template operated by the computing device the common user interface to display, according to the user input, at least one visualization involving the one or more metrics and the one or more analytics in a requested unit of measure for a requested reporting interval, wherein configuring the common user interface to display the at least one visualization comprises:

obtaining a subset of the information from the data store;

calculating values for the one or more metrics using the obtained subset of the information; and configuring the common user interface to display the calculated values for the one or more metrics in a format defined by the one or more analytics using an equipment or material filter selected for the one or more metrics, and wherein the one or more metrics are used by an external system for monitoring key performance indicators (KPIs) or other information about the industrial process control and automation system.

2. The method of claim 1, wherein the subset of the information is related to multiple ones of the multiple sources.

3. The method of claim 1, wherein the one or more metrics and the one or more analytics are user-defined, the method further comprising:

providing a second common user interface configured to display data and receive user input associated with defining the one or more user-defined metrics and analytics.

4. The method of claim 1, wherein the one or analytics further comprise:
a comparison of planned values versus actual values for the one or more metrics, and
a comparison of two or more plans or schedules associated with the one or more metrics.

5. The method of claim 1, wherein the common user interface is configured as a website or an application for a mobile device.

6. The method of claim 1, wherein the multiple sources comprise two or more of: an actuals system, a scheduling system, and an ERP system.

7. The method of claim 1, wherein the multiple functional domains comprise at least one of: production and distribution.

8. An apparatus for workflow analytics and visualization of assimilated supply chain and production management for an industrial process control and automation system, the apparatus comprising:
at least one processing device configured to:
obtain information identifying transactions from multiple sources including information from external source systems, the transactions related to multiple functional domains of a supply chain associated with at least one industrial process in the industrial process control and automation system, the step of obtaining includes configuring a unified model based on source system models for each of the external source systems and based on one or more equipment of the industrial process control and automation system, wherein the unified model is configured using a configuration tool by integrating the source system models of the external source systems and mapping of the one or more equipment with the unified model;
store the information in a data store according to the unified model, the unified model representing all of the multiple sources, wherein the data store includes a common relational database that consolidates the information from the multiple sources;
provide a common user interface for different functional users, the common user interface operated by a computing device and configured to display multiple views, reports and visualizations associated with the transactions;
obtain, according to a user input at the common user interface, one or more metrics and one or more analytics from the data store, the one or more metrics and the one or more analytics associated with the obtained information, wherein the one or more analytics comprise a visualization of the one or more metrics over a period of time and at a requested interval using a time format associated with a time zone of a client machine; and
configure using a customizable template operated by the computing device the common user interface to display, according to the user input, at least one visualization involving the one or more metrics and the one or more analytics in a requested unit of measure for a requested reporting interval, wherein configuring the common user interface to display the at least one visualization comprises:
obtaining a subset of the information from the data store;
calculating values for the one or more metrics using the obtained subset of the information; and
configuring the common user interface to display the calculated values for the one or more metrics in a format defined by the one or more analytics using an equipment or material filter selected for the one or more metrics, and
wherein the one or more metrics is used by an external system for monitoring key performance indicators (KPIs) or other information about the industrial process control and automation system.

9. The apparatus of claim 8, wherein the subset of the information is related to multiple ones of the multiple sources.

10. The apparatus of claim 8, wherein:
the one or more metrics and the one or more analytics are user-defined; and
the at least one processing device is further configured to provide a second common user interface configured to display data and receive user input associated with defining the one or more user-defined metrics and analytics.

11. The apparatus of claim 8, wherein the one or analytics comprise:
a comparison of planned values versus actual values for the one or more metrics, and
a comparison of two or more plans or schedules associated with the one or more metrics.

12. The apparatus of claim 8, wherein the at least one processing device is further configured to configure the common user interface as a website or an application for a mobile device.

13. The apparatus of claim 8, wherein the multiple sources comprise two or more of: an actuals system, a scheduling system, and an ERP system.

14. The apparatus of claim 8, wherein the multiple functional domains comprise at least one of: production and distribution.

15. A non-transitory computer readable medium for workflow analytics and visualization of assimilated supply chain and production management for an industrial process control and automation system containing instructions that when executed cause at least one processing device to:
obtain information identifying transactions from multiple sources including information from external source systems, the transactions related to multiple functional domains of a supply chain associated with at least one industrial process in the industrial process control and automation system, the step of obtaining includes configuring a unified model based on source system models for each of the external source systems and based on one or more equipment of the industrial process control and automation system, wherein the unified model is configured using a configuration tool by integrating the source system models of the external source systems and mapping of the one or more equipment with the unified model;
store the information in a data store according to the unified model, the unified model representing all of the multiple sources, wherein the data store includes a common relational database that consolidates the information from the multiple sources;
provide a common user interface for different functional users, the common user interface operated by a computing device and configured to display multiple views, reports and visualizations associated with the transactions;

obtain, according to a user input at the common user interface, one or more metrics and one or more analytics from the data store, the one or more metrics and the one or more analytics associated with the obtained information, wherein the one or more analytics comprise a visualization of the one or more metrics over a period of time and at a requested interval using a time format associated with a time zone of a client machine; and configure using a customizable template operated by the computing device the common user interface to display, according to the user input, at least one visualization involving the one or more metrics and the one or more analytics in a requested unit of measure for a requested reporting interval, wherein configuring the common user interface to display the at least one visualization comprises:

obtaining a subset of the information from the data store;

calculating values for the one or more metrics using the obtained subset of the information; and configuring the common user interface to display the calculated values for the one or more metrics in a format defined by the one or more analytics using an equipment or material filter selected for the one or more metrics, and wherein the one or more metrics is used by an external system for monitoring key performance indicators (KPIs) or other information about the industrial process control and automation system.

16. The non-transitory computer readable medium of claim 15, wherein the subset of the information is related to multiple ones of the multiple sources.

17. The non-transitory computer readable medium of claim 15, wherein:

the one or more metrics and the one or more analytics are user-defined; and the non-transitory computer readable medium further contains instructions that when executed cause the at least one processing device to provide a second common user interface configured to display data and receive user input associated with defining the one or more user-defined metrics and analytics.

* * * * *